United States Patent
Groten et al.

(10) Patent No.: US 9,761,052 B2
(45) Date of Patent: Sep. 12, 2017

(54) DETERMINING SPACE TO DISPLAY CONTENT IN AUGMENTED REALITY

(71) Applicant: Layar B.V., Amsterdam (NL)

(72) Inventors: Dirk Groten, Amsterdam (NL); Klaus Michael Hofmann, Amsterdam (NL)

(73) Assignee: LAYAR B.V., Amsterdam (NL)

(*) Notice: Subject to any disclaimer, the term of this patent is extended or adjusted under 35 U.S.C. 154(b) by 88 days.

(21) Appl. No.: 14/423,922

(22) PCT Filed: Aug. 27, 2013

(86) PCT No.: PCT/EP2013/067711
§ 371 (c)(1),
(2) Date: Feb. 25, 2015

(87) PCT Pub. No.: WO2014/033121
PCT Pub. Date: Mar. 6, 2014

(65) Prior Publication Data
US 2015/0221133 A1    Aug. 6, 2015

(30) Foreign Application Priority Data
Aug. 31, 2012  (EP) .................................... 12182580

(51) Int. Cl.
*G06T 19/00* (2011.01)
*G06F 3/0346* (2013.01)
(Continued)

(52) U.S. Cl.
CPC .......... *G06T 19/006* (2013.01); *G06F 3/0346* (2013.01); *G06K 9/00671* (2013.01);
(Continued)

(58) Field of Classification Search
CPC .................................................... G06T 19/006
See application file for complete search history.

(56) References Cited

U.S. PATENT DOCUMENTS

| 7,266,575 B2* | 9/2007 | Ikeda ....................... G06F 7/588 |
| | | 708/250 |
| 8,164,649 B2* | 4/2012 | Abe ..................... H04N 1/6077 |
| | | 348/223.1 |

(Continued)

OTHER PUBLICATIONS

Duy-Nguyen Ta et al, SURFTrac: Efficient Tracking and Continuous Object Recognition using Local Feature Descriptors IEEE Computer Society Conference on Computer Vision and Pattern Recognition (CVPR'09), Miami, Florida, Jun. 20-25, 2009.

(Continued)

*Primary Examiner* — Kee M Tung
*Assistant Examiner* — Grace Q Li
(74) *Attorney, Agent, or Firm* — Steven M. Koehler; Westman, Champlin & Koehler, P.A.

(57) ABSTRACT

A method for improving the placement of virtual content in augmented reality is disclosed. A reference image of the object to be augmented is analyzed for feature density information. The placement of content is based on the at least one location adjacent to where features are concentrated. Accordingly, the chance of the content interfering with an important part of the object is lowered, and object recognition and/or tracking ability is maintained because there are sufficient features nearby the content to enable object recognition and/or tracking.

18 Claims, 13 Drawing Sheets

(51) Int. Cl.
    *G06T 11/60*    (2006.01)
    *G06T 11/00*    (2006.01)
    *G06K 9/00*     (2006.01)

(52) U.S. Cl.
    CPC .............. *G06T 11/00* (2013.01); *G06T 11/60* (2013.01); *G06T 2219/2004* (2013.01); *G06T 2219/2016* (2013.01); *G06T 2219/2021* (2013.01)

(56) References Cited

U.S. PATENT DOCUMENTS

| | | | | |
|---|---|---|---|---|
| 9,041,722 | B2* | 5/2015 | Gloudemans | G06T 15/20 345/582 |
| 2004/0165524 | A1* | 8/2004 | Chen | H04L 27/2623 370/208 |
| 2006/0188131 | A1* | 8/2006 | Zhang | G06T 7/0044 382/103 |
| 2010/0316281 | A1* | 12/2010 | Lefevre | G06T 7/0046 382/154 |
| 2011/0205358 | A1* | 8/2011 | Aota | G01S 19/23 348/143 |

OTHER PUBLICATIONS

International Search Report for corresponding PCT/EP2013/067711, filed Aug. 27, 2013.
Edward Rosten et al: "Real-Time Video Annotations for Augmented Reality", Jan. 1, 2005, Advances in Visual Computing Lecture Notes in Computer Science: LNCS, Springer, Berlin, DE, pp. 294-302.
Vineet Thanedar et al, "Semi-automated Placement of Annotations in Videos", (2004).

* cited by examiner

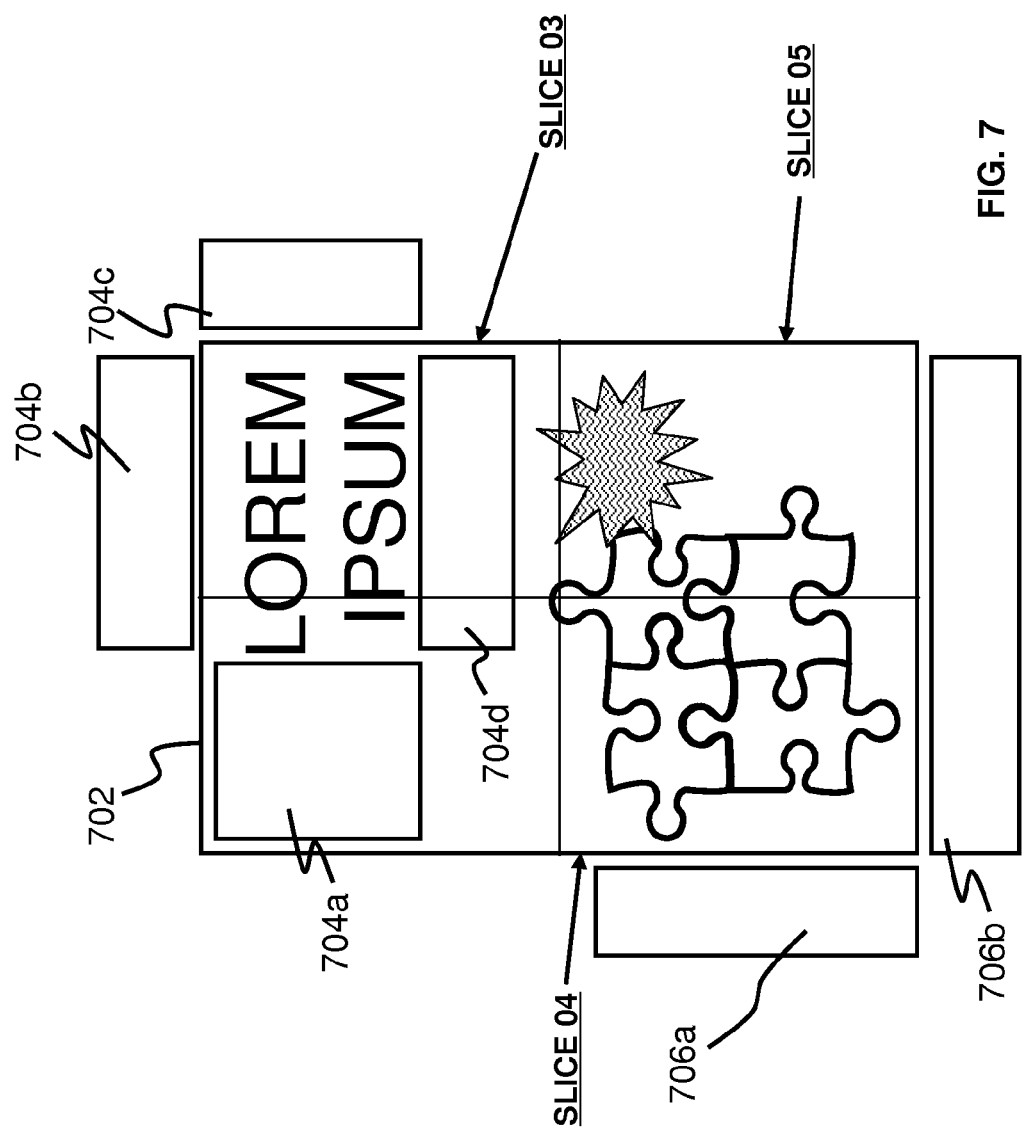

DETERMINING SPACE TO DISPLAY CONTENT IN AUGMENTED REALITY

CROSS-REFERENCE TO RELATED APPLICATION

This application is a Section 371 National Stage Application of International Application PCT/EP2013/067711 filed Aug. 27, 2013 and published as WO2014/033121 A1 in English.

FIELD OF INVENTION

The disclosure generally relates to processing of a reference image and determining a suitable space for displaying content in augmented reality. In particular, though not exclusively, the disclosure relates to methods and systems for automatically placing augmented reality content, an optimizer, an augmented reality client, an augmented reality system, and a computer program product using such methods.

BACKGROUND

The discussion below is merely provided for general background information and is not intended to be used as an aid in determining the scope of the claimed subject matter.

Due to the increasing capabilities of multimedia devices, mobile augmented reality (AR) applications are rapidly expanding. These AR applications allow enrichment (augmentation) of a real scene with additional content, which may be displayed to a user in the form of augmenting a camera image of the real-world scenery with computer generated graphics. The augmentation thereby provides an "augmented reality" user-experience.

Augmented reality platforms, such as the Layar Vision platform, allow an AR application to recognize an object in an image frame and to render and display content together with the recognized object. In particular, an AR application may use vision-based object recognition processes to recognize whether a particular object is present in the scene. Furthermore, the AR application may use a pose estimation process to determine position and/or orientation (pose information) of the object based on information in the image frame and sensor and/or camera parameters. The pose information is then used to generate the augmentation for the object.

Examples of known image processing algorithms for object recognition and tracking are described in the article by Duy-Nguygen Ta et al. "SURFrac: Efficient Tracking and Continuous Object Recognition using local Feature Descriptors" IEEE Computer Society Conference on Computer Vision and Pattern Recognition (CVPR'09), Miami, Fla., Jun. 20-25, 2009. Object recognition may include extracting features from the image frame and matching these extracted features with reference features associated with objects stored in a database. By matching these reference features with the extracted features, the algorithm may determine that an object is "recognized". Thereafter, the recognized object may be subjected to a pose estimation (tracking) process wherein the new state of the object is estimated on the basis of new observables (e.g. a new image frame and its extracted features) and the previous state of the object determined on the basis of a previous image frame. Computer generated graphics are generated using pose information estimated in the tracking process, and the computer generated graphics are then composed with the camera image of the real word scenery. As a result, the computer generated graphics appear "stuck" onto the object to the user.

Content creation for augmented reality may be time consuming if a large number of real world objects are to be augmented. Content creation may require complex technical expertise on the part of the content author. One possible solution to these problems is to automatically place content (i.e. the computer generated graphics), such as text, images, videos, advertisements, etc., by placing the content anywhere or at random in relation to the object. However, such a method has disadvantages. Automatically-placed content can unintentionally cover or obscure an important part of the object, thereby negatively affecting user experience. Further, if the image frame of the real world scenery depicts only a small part of the object (e.g., if the user is zoomed-into or looking mostly at the automatically-placed content), then the augmented reality system would be unable to recognize the object or perform tracking. In other words, the content would disappear from the display because the automatically-placed content is placed near an area of the object where there are insufficient features to enable object recognition and/or tracking.

Accordingly, there is a need to provide improved methods and systems that at least alleviate some of these problems.

SUMMARY

Hereinafter, embodiments of the disclosure aiming to alleviate the problem(s) described above will be described in further detail. It should be appreciated, however, that these embodiments may not be construed as limiting the scope of protection for the present disclosure. For instance, combinations of any of the embodiments and limitations are envisioned by the disclosure.

A method for determining placement of a virtual content item in relation to a real world object in augmented reality is disclosed. One objective is to place content in a place that does not obscure salient parts of the real world object. Another objective is to place content near a place having sufficient features to enable object recognition/tracking, e.g., even when the user device has "zoomed-into" the object. Locations of features in an image of the object are determined from an image of the real world object, e.g., a reference image. In the context of this disclosure, the features are suitable for object recognition and/or tracking.

On the basis of the locations of the features, an algorithm may be used to optimize the placement of the content in view of the objectives. For at least one possible/candidate region for placing the virtual content item, said possible region defined by a possible position (X) in relation to the image and a possible size (S), more than one measure may be determined to calculate a given region's suitability for content.

A first measure ($D_i$) representative of feature density within the possible region based on the locations of features in the image is determined. This measure enables a measurement of whether the region would cover or obscure an area of importance (i.e., assumed to be a region having a high density of features). For instance, the location of features in the image may be used to determine which features and/or how many features fall within the possible region.

A second measure ($D_a$) representative of feature density, e.g., within an area surrounding the possible region, adjacent to the possible region is determined. This measure enables a measurement of whether the region is adjacent to sufficient features to enable object recognition and/or tracking. For instance, the location of features in a (predefined) area surrounding the possible region may be used to determine which features and/or how many features fall within that surrounding area.

A third measure ($p_o(f)$) is also determined, wherein the third measure is correlated with the first measure in a first direction (e.g., positive or negative), and is correlated with the second measure in a second direction opposite from the first direction (e.g., negative or positive, respectively). At least one region from the at least one possible region for placing the content item is determined and/or selected based on the third measure. For instance, the third measure may be compared against a criteria (e.g., ranking of the values, threshold test, etc.) that determines whether the candidate region is suitable enough for content placement and/or whether the value for the third measure is good and/or high enough. This third measure enables the optimization to balance the two objectives. In one instance, the third measure is negatively correlated with the first measure (e.g., decreases the value for the third measure, penalizes) and positively correlated with the second measure (i.e., increases the value for the second measure, incentivizes), or vice versa.

A possible or candidate region refers to a place and/or an area which may be suitable for placing the virtual content item. Some measure is determined for at least one possible/candidate region to consider whether the region is suitable as a place or area for placing virtual content. In the context of optimization, a plurality of possible/candidate regions are examined to determine a subset of the regions as being more suitable than other regions. As a result, that subset of the regions may be selected as a result of the optimization process.

According to one aspect, for the at least one possible region for placing the virtual content item, the algorithm determines a fourth measure ($p(X,S)$) of whether the possible region overlaps with another virtual content item placed in relation to the real world object. In some embodiments, this measure enables the placement selection to ensure the placement of the content does not interfere and/or overlap with other content that had already been placed. In certain embodiments, the measure enables the placement to take into account any forbidden or preferred areas in which the placement should be selected. The algorithm then selects the at least one region based further on the fourth measure.

According to one aspect, for the at least one possible region for placing the virtual content item, the algorithm determines a fourth measure ($p(X,S)$) of the prior probability of placing the virtual content item at the respective location. In certain embodiments, the measure enables the placement to take into account any forbidden or preferred areas in which the placement should be selected. The algorithm then selects the at least one region based further on the fourth measure. The algorithm then selects the at least one region based further on the fourth measure.

In some embodiments, the fourth measure may be defined as having a non zero value when the possible region does not overlap with another virtual content item placed in relation to the real world object and/or does overlap with predefined area of allowed placement in relation to the real world object.

According to one aspect, the third measure is a probabilistic measure of the possible region being a suitable placement for the virtual content item given the location of features in the image of the object. The algorithm, being based on a probabilistic framework, enables the optimization to be performed efficiently and effectively while balancing the objectives. For instance, the selection of the at least one region product is based on a product of (1) a likelihood term based on the third measure, and (2) a prior probability term based on the fourth measure. As such, the likelihood term provides a balance of the two objectives, and the prior probability term provides further consideration of other restrictions on where the content item should be placed. By finding a product of the two, the resulting selection on the basis of the product takes into account the two objectives as well as the other restrictions.

According to one aspect, the method of any of the above claims, wherein the third measure is determined based on a function of a ratio between the first measure and a second measure, such as, $$f(X,S) = \begin{cases} \frac{D_i}{D_a}, & \frac{D_i}{D_a} < m \\ m, & \text{otherwise} \end{cases}$$

where m is a maximum value for the ratio to prevent numerical issues for the when $D_a$ becomes close to zero. The ratio enables the two objectives to be balanced in optimizing the placement of content. For instance, the third measure is defined as $$p_o(f) = \lambda_f \exp^{-\lambda_f f(X,S)}$$

wherein the rate parameter $\lambda_f$ determining the steepness of the probability density function, and $f(x,y)$ is the function comprising the ratio between the first measure and a second measure. The formulation provides a higher probability for a region with a higher suitability for placement.

According to one aspect, the position and the size of the selected region are provided to an augmented reality application, wherein the augmented reality application is configured to generate computer graphics on the basis of the position, the size, and a pose of the real world object estimated from an image frame, said computer graphics being for display to a user on a display device of an augmented reality system. Accordingly, the substantially optimal placement of the content is used for generating an augmented reality view.

An optimizer for use in an augmented reality system, wherein the optimizer is configured to perform any of the methods herein is disclosed. At least part of said optimizer may be implemented in a server remote from a user device, and/or may be implemented in the user device.

An augmented reality client of an augmented reality system comprising the optimizer and/or communicably connected to the optimizer is disclosed. The client may include an image processing function for determining a pose of the real world object on the basis of an image frame captured by a digital imaging device of the augmented reality system. The client may further include a graphics generator for generating computer graphics on the basis of the determined pose, the position and the size of the selected region, said computer graphics for display to a user on a display device of the augmented reality system.

An augmented reality system comprising an augmented reality client is disclosed. Said system may include a reference features generator for extracting a first reference features set on the basis of the image of the real world object. The system may further include the image processing function for determining the pose of the real world object further on the basis of the first reference features set. In some embodiments, the reference features generator is for extracting a second reference features set on the basis of a portion of the image of the real world object. In some embodiments, the image processing function determines the pose of the real world object further on the basis of the second reference features set. By generating a reference feature set on the basis of a portion or slice of the original reference image, the image recognition and/or tracking process is improved, even when the user is "zoomed-in" at the object.

The disclosure may also be related to a computer program product, implemented on computer-readable non-transitory storage medium, the computer program product configured for, when run on a computer, executing the method according to any one of the method steps described above.

The disclosed embodiments will be further illustrated with reference to the attached drawings, which schematically show embodiments according to the disclosure. It will be understood that the disclosure is not in any way restricted to these specific embodiments.

BRIEF DESCRIPTION OF DRAWINGS

FIG. 7 depicts illustrative placements of content in relation to the slices of the reference image, according to one embodiment of the disclosure;

DETAILED DESCRIPTION OF DRAWINGS

Figure 1:
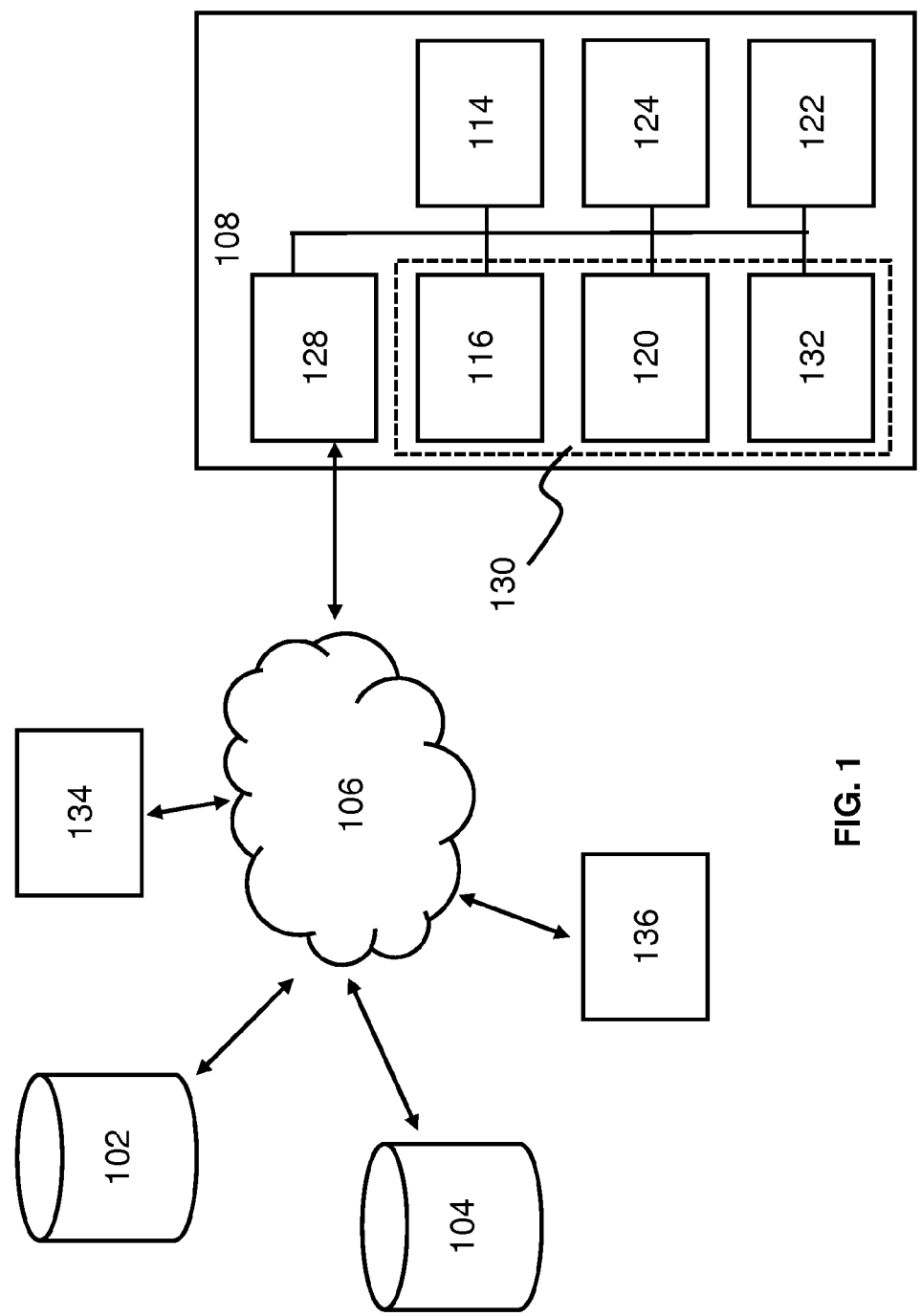
FIG. 1 depicts an illustrative augmented reality system.

FIG. 1 depicts an illustrative augmented reality system. In particular, the AR system may comprise one or more (mobile) augmented reality (AR) devices 108 configured for providing an AR application 130. The AR device may comprise a plurality of components, modules and/or parts that may be communicably connected together by a communication bus or signal line(s). In some embodiments, those sub-parts of the AR device may be implemented as a group of separate devices/components.

An AR device may be communicably connected by communication module 128 to one or more servers over a data transport network 106, e.g. the Internet, databases, and/or data sources, which may be configured for storing, processing, and/or serving information. In some embodiments, the information may be stored at least locally on the AR device (e.g., in memory). Depending on the application, a proxy 134 may be provisioned to process communications from the one or more AR devices to, e.g., sources 102, 104.

In some embodiments, the AR system may comprise at least a reference features source 102 comprising reference features sets, e.g., generated from reference images. Said reference features sets may be used by the AR application for object recognition and tracking (i.e., to determine pose information associated with one or more objects in camera image frames).

Further, the AR system may comprise a content source 104 comprising (virtual) content item(s), which may be retrieved by an AR application to augment an object recognized and/or tracked by the AR application. For instance, the AR application may query the content database with an identifier of the object to retrieve a content item associated with the object. The retrieved content may be used to generate computer generated graphics to augment the object. A content creator, e.g., a service provided by server 136, may be provided such that a content provider may submit reference image(s) and/or content item(s) to be used for the augmentation(s).

The AR device may comprise a digital imaging part 114, e.g. an image sensor such as an active pixel sensor or a CCD, for capturing images of the real world scenery. The image sensor may generate one or more image frame(s) capturing the real world scenery, which may be stored in an image frame buffer in memory 124 (that is accessible by the AR application). The digital imaging part may include optical and/or digital zooming functionalities.

The AR application may comprise an image processing function 116 for processing image frames. The AR application may comprise a graphics generating function 120 for producing computer generated graphics using content item (s) from the content source. The AR application may comprise a controller 132 for monitoring the outcome of the image processing function for certain state transition conditions as well as maintaining the state information of the AR application. Alternatively or additionally, the controller may be configured with a (mapping) function for outputting a configuration for the image processing function on the basis of certain inputs, such as state information. The state information may be stored in the memory.

The AR device may comprise a display 122. Image frames and any suitable computer generated graphics for the augmented reality experience may be rendered for display to the user via the display. The display may be a light emitting display or any other any suitable output device for presentation information in visual form perceivable by a user. In one embodiment, the display may include a projection-based display system, e.g. projection glasses/goggles or a projection system for projection of visual information onto real world objects. In some other embodiments, a display may include a head-mounted display system configured for optically information into the eyes of a user through a virtual retinal display.

Figure 2:
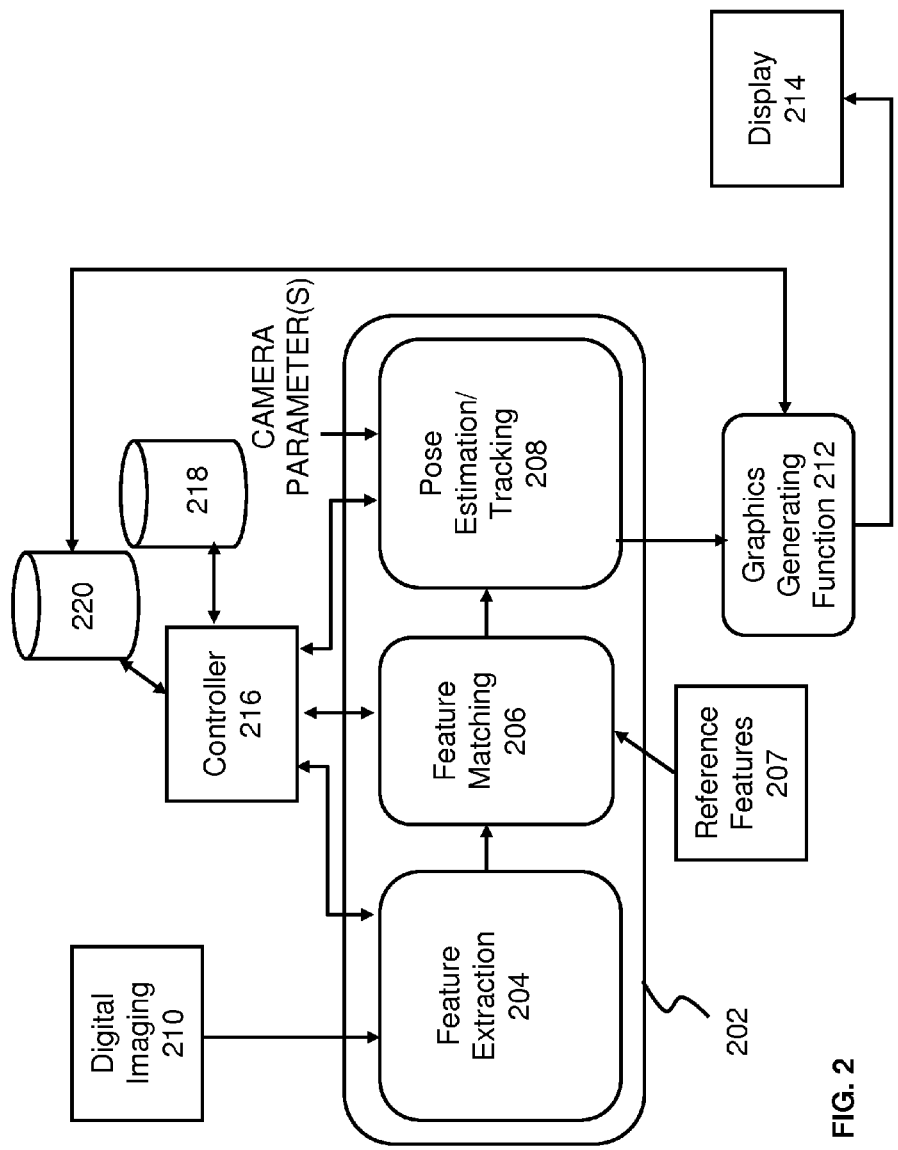
FIG. 2 depicts an illustrative image processing function and at least one part of the augmented reality system.

FIG. 2 depicts an illustrative image processing function and at least one part of the augmented reality system. The image processing function may comprise a feature extraction function 204, a feature matching function 206 and a pose estimation/tracking function 208. Generally speaking, the result and/or success of the image processing function is dependent on (quality and/or quantity of) features in an image frame.

The feature extraction function may receive one or more image frames from the digital imaging part 210 (e.g., a camera). The feature extraction function may then extract suitable features (e.g., specific structures in an image such as edges or corners) from the image and store these extracted features (an extracted feature set) in a memory. The extracted features are features suitable for use in object recognition and/or pose estimation.

Then, after extracting features from the image frame, a feature matching function 206 may be executed. The feature matching function may receive reference features sets 207 associated with one or more objects that may be of interest. These reference features sets may be requested from a reference features source. Alternatively, at least some of the reference features sets may be pre-loaded or pre-provisioned in a memory of the AR device. Thereafter, the extracted features set may be matched with the reference features set(s) associated each object. The implementation of the matching process may depend on the type of feature descriptor used. For example, matching may be computed on the basis of the Euclidean distance between two vectors, the Hamming distance between two bitmasks, etc.

As a result of the matching process, pairs of matched extracted/reference features, i.e., corresponding feature pairs, may be generated wherein an error score may be assigned to each pair. A threshold parameter associated with the error score may be used in order to determine which matched pairs are considered to be successful corresponding feature pairs. The result of this process is a list of corresponding feature pairs, i.e. a list of pairs of extracted and reference features having an error score below the threshold parameter.

On the basis of the list of corresponding feature pairs, a pose estimation function 208 may calculate the pose information associated with the object. For instance, the pose estimation function may determine an estimate of the pose parameter of the object with reference to the AR device which can be determined on the basis of the intrinsic camera parameters, including the focal length and the resolution of the image sensor. The intrinsic parameters relate to the parameters used in the well-known 3×4 homogeneous camera projection matrix. Pose estimation may be done by a fitting processes wherein a model of the target object is fitted to the observed (extracted) features using e.g. function optimization. As the list of corresponding feature pairs may likely contain pairs, which negatively influence the estimation process (so-called "outliers"), the model fitting may comprise a process wherein outliers are identified and excluded from the set of corresponding features pairs. The resulting feature set (the so-called "inner" set) may then be used in order to perform the fitting process.

In the context of this disclosure, when the pose information is successfully estimated, the image processing function has detected a particular object on the basis of a particular reference features set. Alternatively, pose information may be considered successfully estimated when the reference features set has one of the highest number of corresponding feature pairs in the feature matching function, and when pose parameters could be estimated in the pose estimation function. One skilled in the art would appreciate that other suitable criteria may be used to determine whether an object has been detected by the image processing function.

The pose information generated by the pose estimation function may then be used by the graphics generation function 212 which uses the pose information to transform (i.e. scaling, reshaping and/or rotating) a predetermined content item so that it may be displayed on display 214 together with the detected object in the image frame (e.g., "appearing stuck to the detected object frame after frame). Content item(s) and any associated metadata (e.g., data of a content item describing the position of the content in relation to a detected object and/or the sizing of the content) may be stored in memory 220.

In some embodiments, the image processing function is dynamically configurable by a controller 216. A state of the image processing function may be stored in memory 218, and the state may be monitored/maintained by the controller. The state may affect at least one of: the image processing function and the graphics generating function. The state may depend on the which reference features set produced a detected object and/or whether an object has been detected. The controller may optimize the operation of the image processing function (e.g., to optimize for speed and/or accuracy) depending on the current state.

Figure 3:
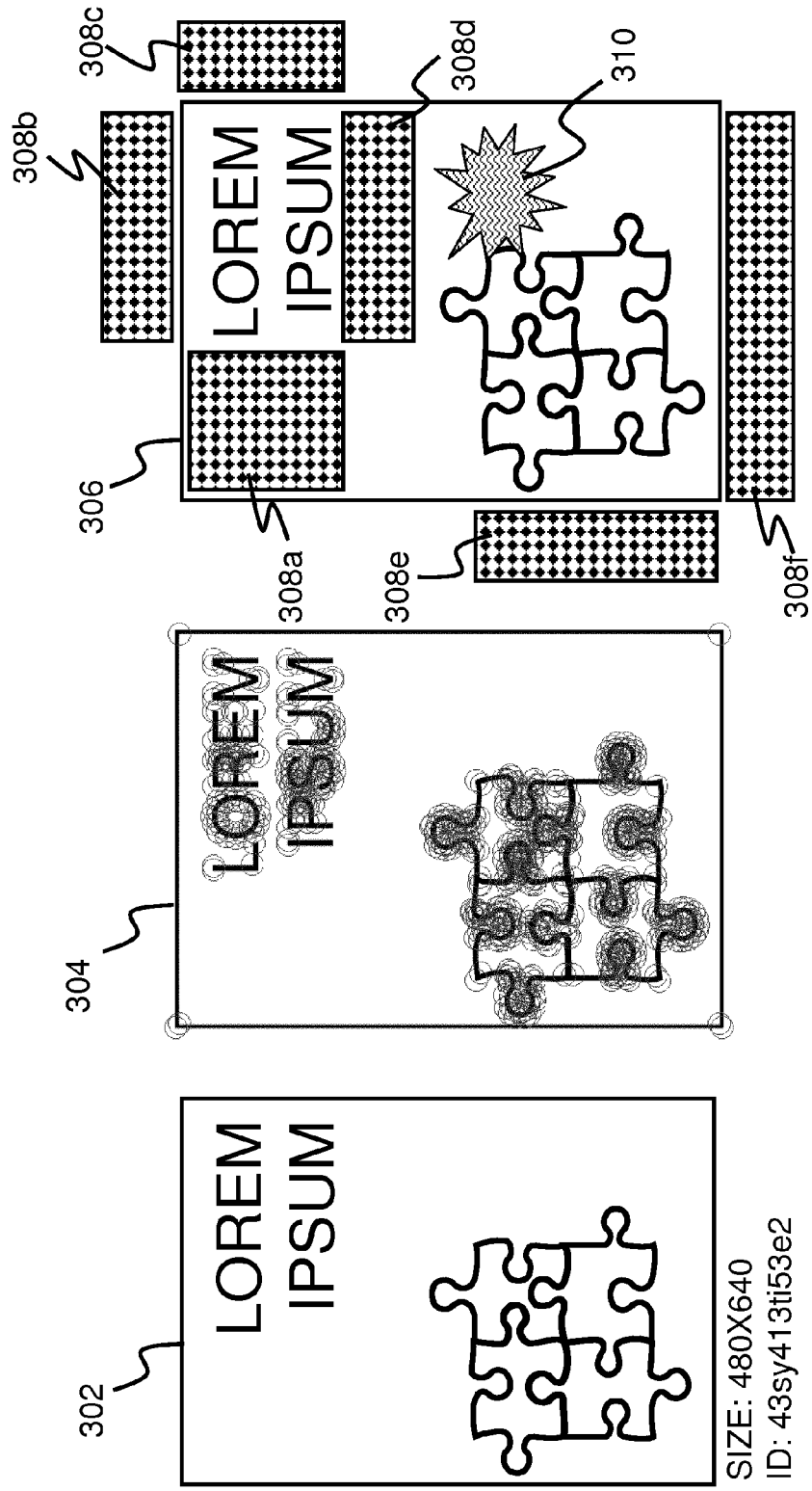
FIGS. 3a-c depict an exemplary reference image, an example features map of the reference image, and an example of where a content item may be placed in relation to the reference image, respectively, according to one embodiment of the disclosure.

FIGS. 3a-c depict an exemplary reference image, an example features map of the reference image, and an example of where a content item may be placed in relation to the reference image, respectively, according to one embodiment of the disclosure. Herein, a content item refers to virtual content and/or a virtual content item, e.g., computer-generated content, computer-generated augmentations to real-world objects, etc.

If a content item is, e.g., randomly placed onto the object, or without regard to the object itself, the content item (i.e., the computer generated graphics) may obscure/overlap important and/or salient parts of the object. If the computer generated graphics is placed next to the object in order to avoid covering important or salient parts (i.e., near the edge/boundary of the object), then there is a risk that there may not be sufficient features at the edge/boundary of the object to enable object recognition and tracking. For instance, edges of objects may comprise blank spaces that are not very suitable for object recognition and/or tracking. Because the computer generated graphics catches the user's attention and the user moves the field of view of the camera towards the edge of the object where the content is placed, then the computer generated graphics would disappear from the display because the object cannot be detected from the features extracted from the image frame captured by the camera (i.e., the image frame having mostly of the edge and not having the other parts of the object where features are concentrated).

To improve the placement of content item(s) (i.e., computer generated graphics) onto the object, an optimizer is provided to determine at least one place(s) in relation to the object such that the content (1) does not obscure an important and/or salient part of the object, and (2) is placed adjacent to or substantially nearby area(s) where there are sufficient number and/or quality of features suitable for object recognition and/or tracking. An optimizer may be provided on the augmented reality device, and/or at source remote from the augmented reality device. The optimizer may be used to determine position information and/or sizing information for automatically placing content in relation to the object and/or for automatically placing additional or further content in relation to the object and the (first) content. The optimizer may include at least one of: computer program instructions stored on non-transitory computer readable medium and hardware, configured to implement the optimization methods disclosed herein.

For example, an exemplary reference image 302 may include two parts that are important and/or salient: (1) the text area having "LOREM IPSUM" and (2) the picture area having puzzle pieces. Thus, content item (i.e., computer generated graphics) is preferably not placed on top of either or both of the text area and the picture areas. In other words, a suitable place to put a content item in relation to the reference image (i.e., the object), is a place that would substantially not obscure the text or the picture.

Further, an example features map 304, e.g., generated by a features analyzer, of the reference image shows that there are two areas where features suitable for object recognition and/or tracking are concentrated. Features are denoted by circle markings on the reference image. By computing feature densities at different locations of the reference image, the suitable place(s) to place content may be determined. The features map may depict or include density information relating to the distribution of features in the reference image. By placing the content item in an area adjacent to where features are concentrated, the ability to perform object recognition and/or tracking is maintained. Accordingly, a suitable place for placing a content item would preferably be a place adjacent to and/or substantially nearby areas where features are sufficiently densely populated.

In this example, the features are concentrated in the areas of importance and/or salience (i.e., in the text area having "LOREM IPSUM" and the picture area having the puzzle pieces). Generally, areas with a lot of features (i.e., details) are assumed to be an area of importance and/or salience. By definition, the suitable place, being adjacent to and/or substantially nearby an area with a lot of features would advantageously not obscure the area(s) of importance and/or salience.

Potential suitable places/regions 308a-f (only illustrative and not to be considered exhaustive and/or limiting) are shown in relation to an exemplary reference image 306. Accordingly, content may be automatically-placed in those suitable spaces. As a result, the computer generated graphics would not obscure the important/salient areas, and is placed adjacent to areas with features suitable for object recognition and/or tracking.

Suitable places 308a-d are spaces adjacent to the text area, and suitable places 308e-f are spaces adjacent to the picture area. The text area and the picture area are assumed to be an area of importance and/or salience as well as an area having a concentration of features suitable for object recognition and/or tracking.

In some embodiments, a content provider may have (already) chosen or determine to place a primary content item 310 (a splash-shaped computer generated graphic) on the object. Accordingly, the automatically-placed content item (i.e., a secondary content item, such as an advertisement) is preferably placed in an area that does not substantially obscure and/or interfere with the primary content item. Accordingly, the optimizer may check against this constraint to ensure that the suitable places does not interfere with the primary content item.

Generally, the reference image has a particular size, in this example, 480 pixels (width)×640 pixels (height), thereby providing a basis from which a coordinate system may be defined. According to the coordinate system (e.g., two-dimensional plane or 3-dimensional space), a suitable place for the content item may be defined in relation to the reference image. The determined suitable place to place content may include position information, and if applicable, size information, such that the position relative to the object and an area/space may be defined.

Figure 4:
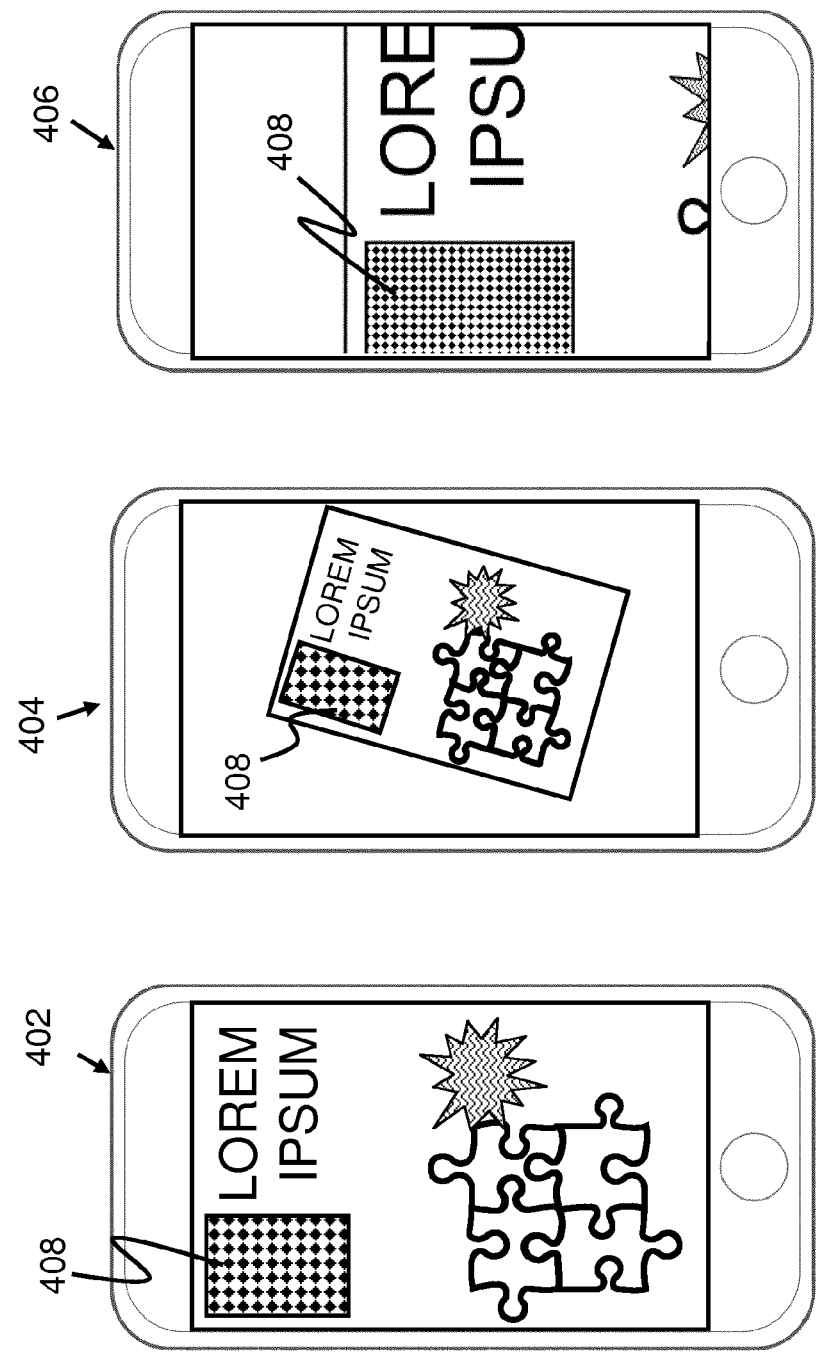
FIG. 4 depict illustrative augmented reality views, according to one embodiment of the disclosure.

FIGS. 4a-c depict illustrative augmented reality views, according to one embodiment of the disclosure. To illustrate the importance of placing content adjacent to and/or nearby regions with a relatively higher concentration of features suitable for object recognition and/or tracking, screens 402, 404, and 406 depicts image frames looking at the object at different levels of zoom (optical and/or digital zoom).

For instance, as seen in illustrative screen 402, the object of interest takes up substantially the entire image frame. Accordingly, (holding other factors constant) object recognition and/or tracking would work well (substantially exactly) because the features in the extracted features set from the camera image frame matches well with the features in the reference features set associated with the reference image.

In another instance, as seen in illustrative device 404, the object of interest is shown completely in the camera. The user device (i.e., the camera) may be positioned farther away from the object of interest, thus the camera image frame appears "zoomed out" (and/or a digital zoom functionality is applied). Object recognition and/or tracking is likely to continue to work well because the features in the reference features set can still be found matching the features in the extracted features set of the camera image frame. Thus, the extracted features set from the camera image frame can still be matched with the reference features set of the reference image. This is especially true if the extracted features set comprises scale-invariant features and/or if a plurality of features sets are extracted from the reference image at various scales.

In practice, object recognition and tracking work best when the features from the reference features set can be successfully matched with the features extracted from the current camera image frame (i.e., features of the extracted features set). But as soon as a user moves the camera closer to the actual object (or applies a digital zoom function), less of the reference features set of the reference image are visible and/or present in the image frame. At some point, the ability to perform object recognition and/or tracking will be lost, since not enough reference features can be found in the camera image frame to allow for object recognition and/or tracking to successfully occur. As a result, the content item (i.e., the computer generated graphics) 408 may disappear from the display. The lack of sufficient features problem is exacerbated if the part of the object captured by the image frame has very little features (i.e., blank spaces). For instance, the user may be interested in the content item and zooms closer to the content item, as seen in screen 406. The image frame captures only a part of the object of interest.

To improve the ability to perform object recognition and/or tracking when zoomed-in, the content item is preferably placed adjacent to and/or nearby regions with a relatively higher concentration of features suitable for object recognition and/or tracking. Advantageously, the success of object recognition and/or tracking is increased.

Furthermore, in some embodiments, a separate reference features set is generated on the basis of the part (or referred to as a "slice" of the reference image having the relatively higher concentration of features, such that object recognition and/or tracking may be performed on the basis of that particular reference features set when the image frame is zoomed into that area. Accordingly, a successful match of features may be found using the reference features set generated from that part of the image. Further details relating to slices are discussed later in relation to FIG. 7.

Figure 5A:
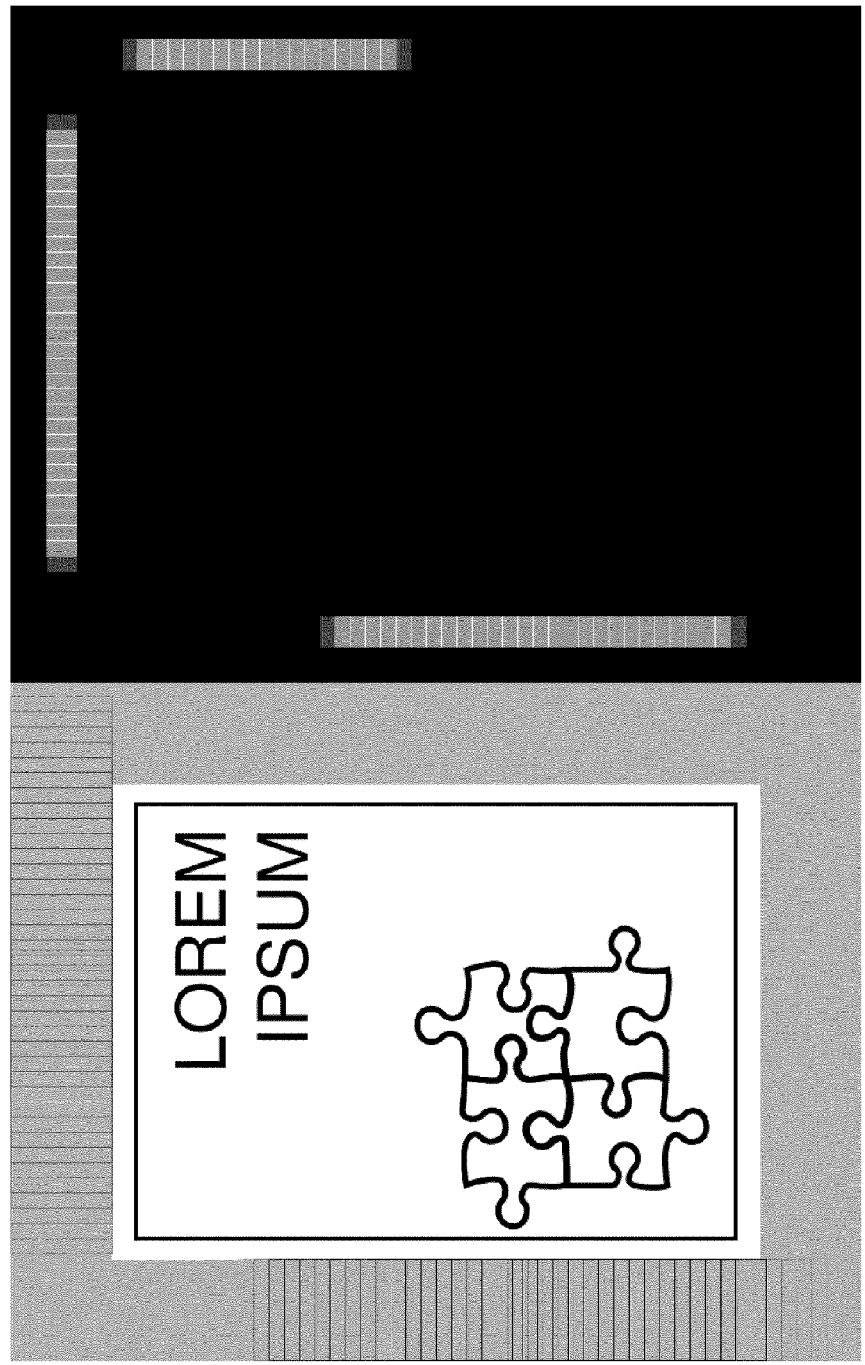
FIG. 5a-b depicts two example maps of possible placements of content in relation to the reference image, according to one embodiment of the disclosure.
Figure 5B:
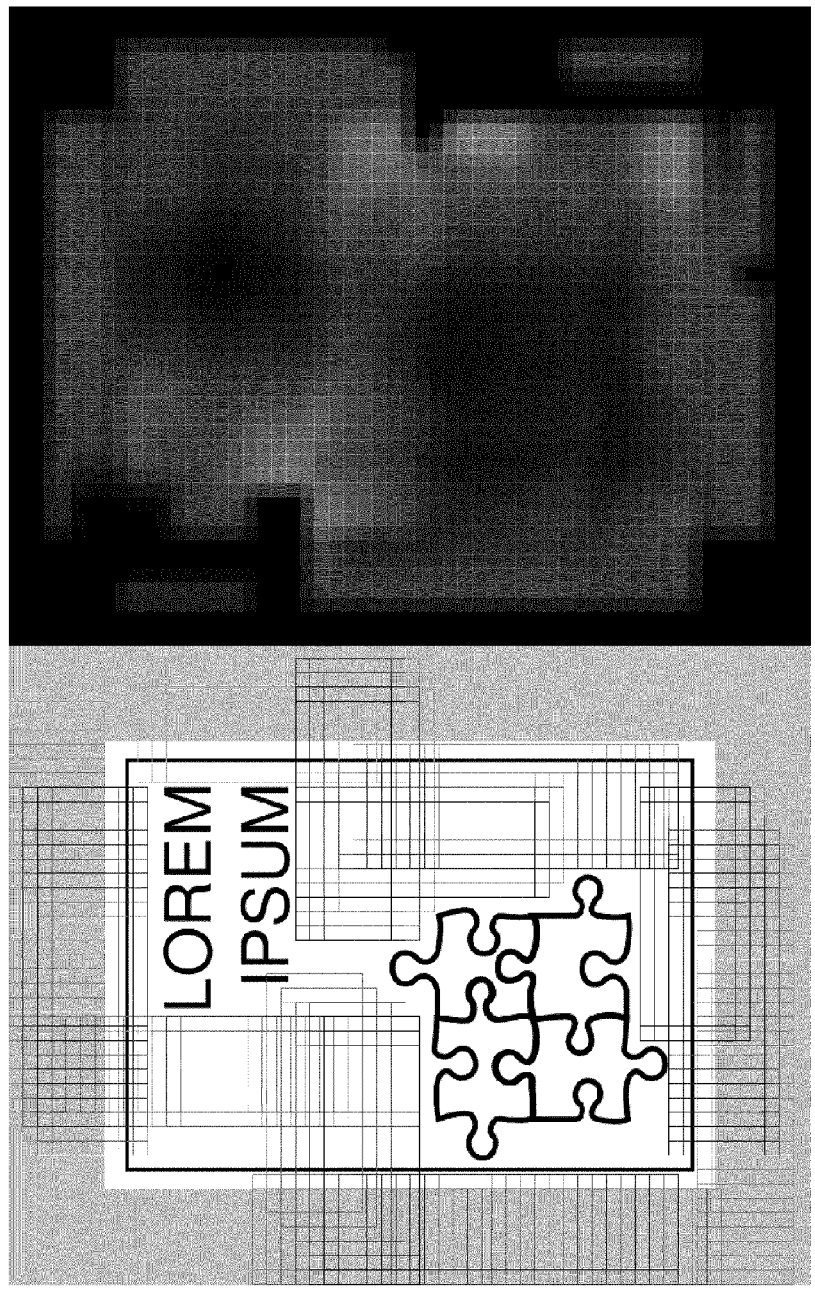

FIG. 5a-b depicts two example maps of possible placements of content in relation to the reference image, according to one embodiment of the disclosure. The illustrative maps may be generated by an optimizer (for content placement) according to a probabilistic framework, where the suitable placement of content (i.e., the computer generated graphics) in relation to the reference image maybe modelled using a probabilistic framework. The probability distribution of suitable places may be evaluated, e.g., by a processor of the optimizer, given observations based on the reference image (e.g., features density). This probability distribution may be described using a generative model. A selector of the optimizer may then select at least one of the possible placements/regions from the results of the probability distribution determined for a plurality of suitable places/regions.

Let X be the state space of possible suitable places on a page (described by a two-dimensional anchor point), S be the state space of possible content sizes (described by a two-dimensional vector denoting width and height), and O be the observation/measurement.

X can be either described by two continuous random variables or, alternatively, by a discrete set of possible 2D positions $$X=(x,y)\in \mathfrak{R} \tag{1}$$

$$X\in\{(x_0,y_0),(x_1,y_1),\ldots\},(x_i,y_i\in \mathfrak{R}\ \forall i) \tag{2}$$

Similarly, for S:

$$S=(w,h)\in \mathfrak{R} \tag{3}$$

$$S\in\{(w_0,h_0),(w_1,h_1),\ldots\},(w_i,h_i\in \mathfrak{R}\ \forall i) \tag{4}$$

Then, using Bayes' rule, the posterior probability of content placement parameters given image observations may be written as:

$$p(X,S\mid O) = \frac{p(O\mid X,S)p(X,S)}{p(O)} \tag{5}$$

Since we do not need to obtain a normalized probability distribution, we may choose to ignore the normalization by the evidence term p(O):

$$P(X,S|O)\propto p(O|X,S)p(X,S) \tag{6}$$

p(X,S) describes the prior probability distribution over position parameters X and size parameters S. The prior probability distribution may be modelled as a joint distribution. In some embodiments, it is also possible to assume that content placement does not depend on the size of the content item and vice versa. In this case, p(X,S) can be modelled independently such that $$p(X,S)=p(X)p(S) \tag{7}$$

Then, equation (6) may be rewritten as $$P(X,S|O)\propto p(O|X,S)p(X)p(S) \tag{8}$$

The likelihood term p(O|X,S) describes the probability of the image observation given the position and size. It can be described by a probability density function $p(O|X,S)\equiv p_o(f)$ over a measurement function $f=f(X,S)$, which may take the state parameters as input and describes some measure of fit for the placement and/or size of the content given a particular state.

The optimal content placement and size given our model can be determined by evaluating arg max P(X,S|O), i.e., the state where the posterior distribution assumes its maximum.

Due to the low dimensionality of the posterior distribution (4-dimensional, assuming continuous variables for X and S), it is feasible to evaluate it over a regular grid of the (continuous) state variables. If the content size is given as a constraint in advance (i.e., S=S*), it reduces the distribution to 2 dimensions, assuming that X is represented by continuous variables.

The space of content positions X may be parameterized by two (continuous) random variables x,y (see Equation (1)), where the vector $(x,y)^T$ denotes, e.g., the upper left corner of the content as the anchor point for placement.

The space of content sizes S may be discrete (see Equation (4)). A discrete space may allow for content among a set of specific sizes to be displayed. Alternatively, the parameterization may use a 1-dimensional continuous random variable w and to compute h linearly dependent on w (h:|=αw, where α is the aspect ratio).

The prior probability distribution p(X) may generally be parameterized in any suitable way. The distribution may be uniform over the region of allowed positions. In one embodiment, the probability density function takes the shape of a bounded flat surface with suitable bounds $(x_0, x_1)$ and $(y_0, y_1)$.

$$p(X) = \begin{cases} \frac{1}{(x_1-x_0)(y_1-y_0)} & \text{for } x_0 \le x \le x_1, y_0 \le y \le y_1 \\ 0 & \text{otherwise} \end{cases} \tag{9}$$

Alternatively, a non-uniform prior distribution may be used to restrict content placement to certain areas relative to the page (including outside the page). For example, in order to advantageously restrict placement to the region outside of the page, the prior probability can be set to 0 for content positions that place part of the content inside the page, and to a constant value (or non-zero positive value) otherwise. Other possibilities for the choice of distribution include piecewise constant regions, a (mixture of) normal distribution(s), etc.

If there is already primary content placed by a content provider, and the optimizer is to determine where to place secondary (or further) content, the prior distribution may be restricted to set the prior probability to 0 for content positions that causes the content to overlap with the primary content, and to a non-zero positive value otherwise. The prior distribution is thus advantageously configured to avoid placing secondary content (such as advertisements) in places that interferes or obscures with the primary content.

To better place content (i.e., computer generated graphics) in relation to the reference image and/or the object in augmented reality, the content is preferably placed in regions close to sufficiently many image features, so that the ability to perform object recognition and/or tracking is maintained even when the user has "zoomed-in" to view the content. On the other hand, content placement may not to obscure regions of the reference image having importance and/or salience. In some embodiments, it is reasonable to assume that regions with high image feature density are more important and provide more context than regions with a very low feature density.

Accordingly, the likelihood term $p_o(f)$ may emit a high probability for content that are placed adjacent to and/or nearby regions with a high image feature density and/or on top of regions with a low feature density.

Let k(X,S) be a function that returns a measure of the feature density with the rectangular region (x,y,x+w,y+h).

Let $D_i=k(X,S)$ be a measure for the image feature density inside the (rectangular) region of a candidate content item.

Let $D_a$ be a measure for the image feature density adjacent to and/or nearby this region.

$$D_a = \max(k(X_{adj0},S), k(X_{adj1},S)) \quad (10)$$

where $X_{adj0}$ and $X_{adj1}$ may be chosen such that they describe the two equally sized regions adjacent to the two longer sides of the content item.

The measurement function $f(X,S)$ may then be defined using the ratio between these two measures, $$f(X, S) = \begin{cases} \frac{D_i}{D_a}, & \frac{D_i}{D_a} < m \\ m, & \text{otherwise} \end{cases} \quad (11)$$

where m is a maximum value for the ratio to prevent numerical issues for the when $D_a$ becomes close to zero. $f(X,S)$ has the property that it assumes small values for the case of low feature densities inside and high feature densities adjacent to the candidate region, and large values for the case of high feature densities inside and low feature densities outside the candidate region.

One suitable choice for the probability distribution $p_o(f)$ of the likelihood term in Equation (6) is the exponential distribution, e.g., $$p_o(f) = \lambda_l \exp^{-\lambda_l f(X,S)} \quad (12)$$

with the rate parameter $\lambda_l$ determining the steepness of the probability density function.

In one embodiment, the feature density $k(X,S)$ is computed by determining the average number of image features by dividing the number of features by the size of the area of the (e.g., rectangular) candidate region of content placement.

$$k(X, S) = \frac{\# \text{features}(X, S)}{wh} \quad (13)$$

For increased efficiency, the feature density may be computed within a grid of local regions (e.g., for a grid of square regions of a small size, for example, 20×20 pixels) and average over the contributions from each local region that falls inside the candidate region of content placement.

The described method has the property that it is invariant to where image features are concentrated inside the candidate region. This might or might not be desirable depending on the particular application. Instead of a simple average, one can also compute a weighted sum of local feature densities, where the weight factor is dependent on the distance from the candidate region center. Candidate regions with a high feature density in their center would be given a better density score than candidate regions with the same feature density close to the border.

An alternative method for determining the feature density is to compute the average distance to the closest feature over the area of the candidate region. In this case, a large average distance signals a low feature density in the respective region, and a small average distance signals a high feature density. The average distance to the closest feature can be computed by means of a distance transform algorithm.

Let $f_{DT}(X,S)$ be a function that computes the average distance to the closest feature, given a placement X and a (candidate) content item size S. Let $f_M: \mathfrak{R} \to \mathfrak{R}$ be a mapping function that returns a measure for the feature density, given the average distance as an input.

For example, $$f_M(x) = \frac{1}{x}.$$

Then, $$k(X,S) = f_M(f_{DT}(X,S)) \quad (15)$$

As seen in the results of FIG. 5a, the posterior probability distribution may be calculated, given a prior probability distribution that restricts possible content placement to outside the reference image (near the edge or boundary). At least any of the indicated placements may be used, and preferably a placement having the maximum probability is used for optimum results. Alternatively, a uniform distribution may be provided as the prior distribution, such that placement within the boundaries of the reference image may also be possible.

In one embodiment, the size of a content item a (e.g., an advertisement) to be placed is pre-determined and/or known. Accordingly, Input to the optimizer may include:
  Reference image I
  Set of content items (or augments) $C = \{C_0, \ldots, C_K\}$
    Each content item is specified by a bounding box:

$C_i = (x_{c_i}, y_{c_i}, w_{c_i}, h_{c_i})$ $x_{c_i}, y_{c_i}$ position information, e.g., the position of the upper left corner of the content item in terms of the coordinate system of the reference image,
    $w_{c_i}, h_{c_i}$ describe sizing information, e.g., the width and height of the content
  Content item a to be automatically placed by the optimizer with bounding box of size $S=(w_a, h_a)$ with bounding box of size
    $w_a, h_a$ describe sizing information of the content, e.g., the width and height
Output from the optimizer may include:
  The determined placement describing the positioning information $X^* = (x_a, y_a)$
    $x_a, y_a$ describe position information, e.g., the position of the upper left corner of the content item a in terms of the coordinate system of the reference image.

The unit of measurement for width, height and positioning may be chosen arbitrarily (e.g. pixels, mm, etc.), as long as the unit of measurement is made consistent or the ratio between different units is known. In case the physical size of the reference image is not known, the size of the content item a may be expressed relative with respect to the size of the image. For example, if the reference image size is (200px in width by 400px in height), the sizing information may be defined half the height of the reference image would be 200px high.

In some embodiments, the optimizer may perform an algorithm which takes the above illustrative input to produce the output for automatically placing a content item. The optimizer may determine locations of keypoints $K = \{(x_{k,0}, y_{k,0}), (x_{k,0}, y_{k,0}), \ldots\}$ ("features") in image I. This keypoint determination step may be performed using a similar algorithm employed by feature extractor as used on an AR application/client for object recognition and/or tracking. Examples of keypoint detection algorithms include: FAST, AGAST, Harris corners, etc. Using the keypoint locations K, the optimizer may compute local feature densities on a discrete grid of fixed-size blocks to speed up computation of average feature densities (the block may be, e.g., 20px by 20px). This has the advantage that the average feature density in the measurement term may be computed as the weighted average of a significantly smaller set of local average densities.

In accordance with the probabilistic framework, the optimizer may determine a prior distribution over space of possible content placement. For instance, the prior distribution may exclude regions with content items already placed in relation to the reference image from being considered, such the (further) content being placed by the optimizer would interfere less with the content item(s) that is already been placed. Therefore, we set the prior distribution as follows:

$$p(X) = \begin{cases} c & \text{for } (x, y) \text{ not to leading to overlap with already placed content item(s)} \\ 0 & \text{otherwise} \end{cases}$$

where c is a suitably chosen constant such that p(X) integrates to 1. (In practice, the choice of constant will have no influence on the result of Equation (9), therefore any constant c may be used.)

The optimizer may determine measurement function and likelihood distribution, as described in herein. For instance, the feature density may be computed using the number of image features per area, which may be computed efficiently using the computed average density.

Accordingly, the optimizer may evaluate Equation (9) by evaluating Equation (6) over, e.g., a discrete set of content placements $X=\{(x_1, y_1), (x_2, y_2), \ldots\}$ which is determined as the cross-product over suitable sets of x and y locations. The result of Equation (9) is the content placement $X^* \epsilon X$ for which Equation (6) is substantially at its maximum. Due to the evaluation of the posterior probability on a discrete grid over the state space, this will be a (reasonably/substantially good) approximation to the true mode of the posterior. $X^*$ may then be considered the optimal placement for a content item of size $\hat{S}$.

In one embodiment, the aspect ratio of a content item b (e.g., an advertisement) to be placed is pre-determined and/or known. The optimizer may evaluate the optimal size in addition to the placement. Using the same framework as above, the optimizer may implement a variation of the above algorithm, but changing the input for the content item to be placed to a known aspect ratio $\alpha$. Furthermore, the input state space now includes of a bounded region of valid widths (or heights) of content item b, $w, w_{min} \le w \le w_{max}$, in addition to the bounded region of valid content placement locations X. Moreover, the posterior probability may be evaluated over a discrete set of content placement locations and sizes, which is determined as the cross-product over sets of positions X and widths $W=\{w_1, w_2, \ldots\}$, as determined by the parameter bounds and a suitable step-size. In each evaluation of the posterior, the bounding box of the content item to be placed may be computed as $\hat{S}=(w, \alpha w)$, where w may be the chosen width in the respective iteration.

Figure 6:
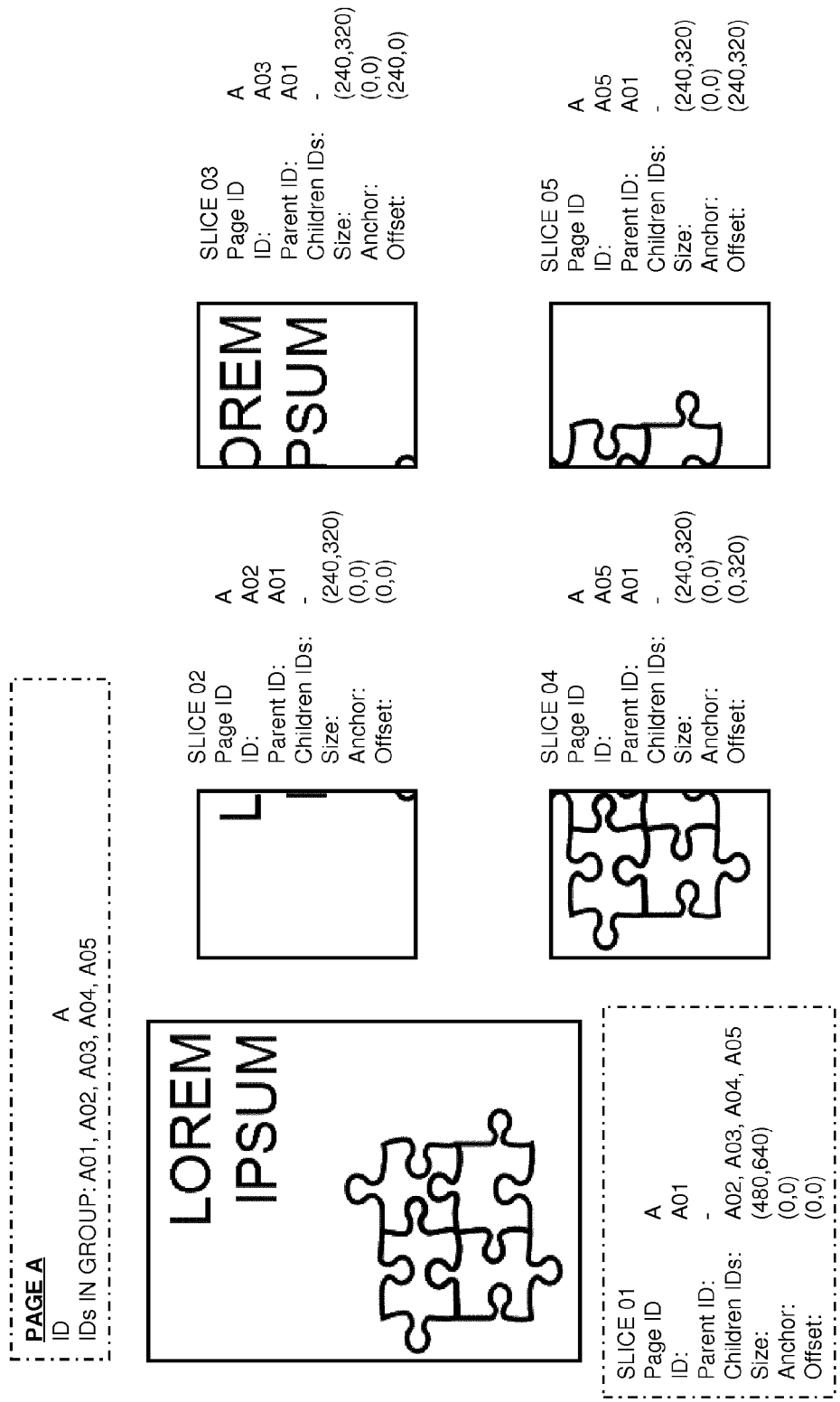
FIG. 6 depicts illustrative metadata associated with a reference image and its slices, according to one embodiment of the disclosure.
Figure 8B:
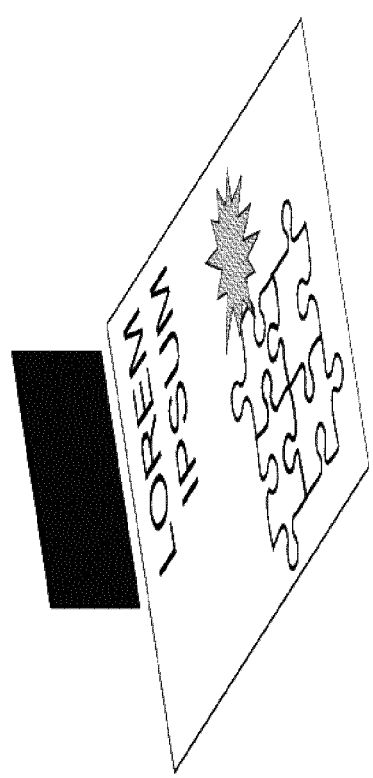
FIGS. 8a-d depict illustrative placements of content in relation to the object, according to one embodiment of the disclosure.
Figure 8D:
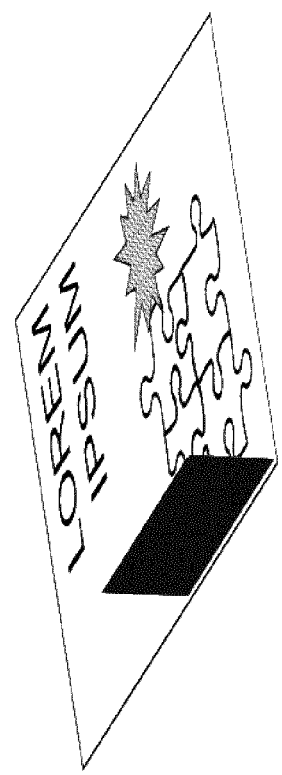
Figure 8A:
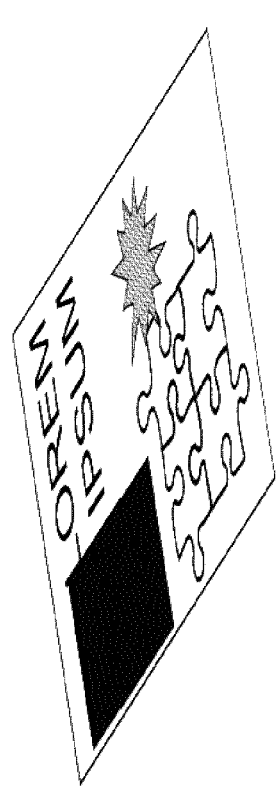
Figure 8C:
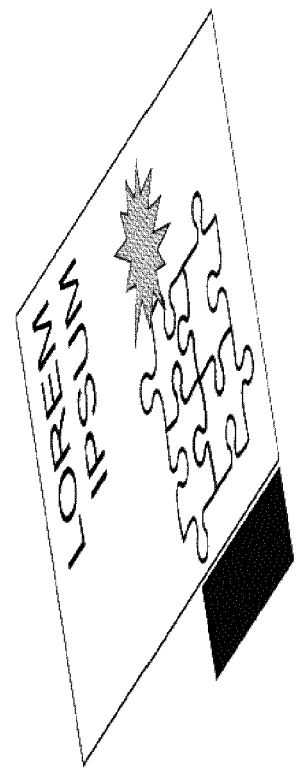

FIG. 6 depicts illustrative metadata associated with a reference image and its slices, according to one embodiment of the disclosure. In some embodiments, the (original) reference image is sliced or at least one portion of the reference image is provided. At least one (further/additional) reference features sets are then generated based on the "slices" to improve object recognition and/or tracking when the user is, e.g., looking at the content closely and/or zoomed in. The reference image and its slices are associated with metadata that improves the processing of reference features in the image processing function. For instance, a controller may monitor the state of the image processing function, and update the state based on the result of the image processing function and/or the metadata associated with the reference features sets of the reference image and its slices. The image processing function may process image frames and reference features sets differently depending on the current state.

Generally, the metadata may be produced as a result of the slicing function, provided as a data structure for describing the relationship of the reference features sets with each other. For instance, metadata provides a data structure where the grouping of reference features sets belonging to the same object or page is indicated. Furthermore, metadata may provide a data structure where the relationship between a slice and its parent original reference image is indicated. Furthermore, the metadata may provide a data structure where the relative distance, the relative positioning and/or size of a slice in relation to the parent original reference image and/or other slices of the original reference image is indicated.

The metadata associated with the object, shown as Page A in this embodiment, comprises an identifier and a list of identifiers in the grouping. The identifier of the object is "A", or any suitable identifier that substantially uniquely identifies the object from other objects of interest. The identifier of the object generally enables a graphics generator to retrieve the content associated with the particular object, such that a graphical item may be generated and provided as augmentations for the particular object. The list of identifiers in the grouping comprises identifiers of the original reference image and the slices of the original reference image.

The metadata associated with a reference image and/or the slice comprises an identifier that substantially uniquely identifies the reference image and/or the slice from others. For instance, the original reference image comprises the identifier ID: A01. In another instance, SLICE 02 comprises the identifier ID: A02. The identifier for the reference image and/or the slice may indicate the object that the reference image and/or the slice belong to (e.g., the character "A" in the identifier indicates that the reference image and/or the slice belongs to Page A).

For the original reference image and the respective slices, the metadata may identify the object that the reference image or slice is associated with (seen as "Page ID"), and an identifier that substantially uniquely identifies the original reference image (seen as "ID").

Exemplary metadata is reproduced below:
Slice 01 (Original Reference Image)
Page ID A
ID: A01
Parent ID: —
Children IDs: A02, A03, A04, A05
Size: (240,320)
Anchor: (0,0)
Offset: (0,0)
Slice 03
Page ID A
ID: A03
Parent ID: A01
Children IDs: —
Size: (240,320)
Anchor: (0,0)

Offset: (240,0)

Furthermore, the metadata may identify the parent-child and/or sibling relationship(s) between the original reference image and the respective slices. The metadata may comprise a data structure for indicating the parent image from which a slice was created and/or which child slice(s) was created using the image. Although this example shows only one parent and one generation having a plurality of children, it is possible that the parent-child relationship comprises further levels in the hierarchy. This may be applicable if slices are created recursively, or further slices are created from slices of the original image.

Advantageously, the metadata identifying the parent-child relationship enables the image processing function to appropriately disregard reference features sets belonging to other objects that had not been previously detected. Furthermore, the metadata identifying the parent-child relationship enables the image processing function to identify and consider the reference features sets belonging to the same object, namely the object that was previously detected.

Sibling information indicating that a plurality of slices originated from the same reference image and/or that they are adjacent and/or close to each other may enable the image processing function to determine which reference features sets are likely to be successful in detecting an object in the next camera image frame. Accordingly, the image processing function may be configured to process those reference features sets differently in the next camera image frame.

Moreover, the metadata may comprise data for describing the size and/or relative positioning of the original reference image and/or the slices. The size may include the size of the image from which the reference features set was generated. For instance, the size may be a pair of numbers, such as the number of pixels in the X and Y axes. The relative positioning may include the coordinate information of the image in relation to the original reference image and/or a parent image from which a slice is created. The relative positioning information may be a pair of numbers, e.g., in terms of the coordinate system provided for the original reference image. For instance, the relative positioning information may include the X and Y coordinates of the upper left most corner of the image with respect to the original image.

Advantageously, sizing and positioning metadata enables the graphics generation function to generate augmentations for the object. For instance, the positioning of a content item (i.e., computer generated graphics) for a particular object comprises location coordinates of the content item with reference to the original reference image. If the image processing function estimates the pose information using the reference features set of a slice of the original reference image, the computer generated graphics may be generated on the basis of the estimated pose information, the sizing and/or relative positioning of the slice, and location coordinates. The graphics generation function may translate the location coordinates into the coordinates with reference to the slice using the sizing and/or relative position of the slice.

In some embodiments, the metadata comprises data for describing an anchor point. The relationship between anchor points and offsets may be transitive across the hierarchy slices on a page, i.e. the placement of augmentations can be encoded with respect to the parent slice. The anchor point influences the placement of the other slices (given their offsets) and respectively of the augmentations. The anchor point may be arbitrarily defined. An anchor point of (0,0) may would describe the top left corner, whereas (50,50) would be the center point given a size of (100,100). If the anchor point of A01 was defined as (50,50), then the slices A02-A05 would have offsets of: (−50,−50), (0,−50), (−50,0), (0,0) for four equal-size quarter slices on the top left, top right, bottom left, bottom right. Addition of offset and anchor point of the parent gives the placement of a slice in coordinates of the parent system.

In some embodiments, the metadata for the relative positioning of the original reference image and/or slices are described in two dimensions. In certain embodiments, the metadata for the relative positioning of original reference image (or object) and/or slices are described in three dimensions and/or in another reference system.

The (spatial) relationship may comprise a two-dimensional transformation, where slices are also rotated in arbitrary angles with each other. In some instances, the relationship may comprise a three-dimensional Euclidean transformations.

The transformation may be expressed by a 3×3 homogeneous transformation matrix, where the upper left 2×2 submatrix may describe the rotation and scaling, and the upper right 2×1 column vector may describe the translation (e.g., the last row of the matrix is (0,0,1)). Alternatively or additionally, the transformation may be expressed by a respective 4×4 homogeneous transformation matrix, with the upper left 3×3 sub-matrix describing rotation/scaling and a 3×1 vector for the translation in the upper right 3×1 column vector (e.g., the last row of the matrix is (0,0,0,1)).

Expressing the relationship between reference images as a full 3D transformation matrix advantageously provides a flexible way to apply slicing to objects of interest that have a three-dimensional character and compose appropriate metadata thereof. For example, images can be arranged in a box shape, a bent/folded shape, or any other shape that is composed of substantially flat surfaces that can be made into slices. Slices may still have a parent/child/sibling relationship, and the relationship between the respective transformations is equally transitive (chain of transformations; transformations can be inversed, etc.).

FIG. 7 depicts illustrative placements of content in relation to the slices of the reference image, according to one embodiment of the disclosure. In this example, the reference image 702 has 4 slices, and a reference features set is generated from at least one of the slices. For instance, the reference features set generated from slice 03 improves object recognition and/or tracking when the user is looking at the upper right portion of the object more closely (e.g., at any of exemplary content items 704a-d). Likewise, reference features set(s) of slice 04 and/or slice 05 improves object recognition and/or tracking when the user is looking at either content item 706a and/or 706b.

Content item(s) associated with a particular reference image/object may be displayed when the object is detected in the image frame. In some alternative embodiments, content item(s) may be associated with a slice (rather than the object itself), such that the content item is displayed when the reference features set of the particular slice produced a positive detection result (i.e., an object is detected on the basis of the reference features set of that slice). In other words, the display of the content item is conditioned on which reference features set (i.e., which slice and/or the original reference image) produced the positive detection result. As such, the optimizer may determine the placement of such content items (wherein the display of such items is conditioned on the reference features set producing the positive detection result) on the basis of the slice instead of the original reference image.

The solution of slicing as discussed above is one way of substantially maintaining the ability to perform object recognition and/or tracking when zoomed-in. Another way to do so is to extract more features from the original reference image, i.e., extract features at a higher resolution and/or using a version of the reference image having a higher resolution. In this manner, even when the current image frame is only showing a part of the object, enough reference features (from the reference features set that was extracted at a higher resolution) can be found matching the features in the current image frame. However, increasing the number of features in a reference features set has two negative side effects. One, the increased number of features in a reference features set leads to higher consumption of computational resources, because each extracted feature is matched against each feature in a reference features set. Two, the increased number of features may lead to more false-positives in object recognition and/or pose estimation, because more features in a particular reference features set increases the chance that an object is falsely detected. One other (more advantageous) way of alleviating the problem above is to generate reference features set(s) from at least one partial image of the original reference image (herein referred to as a "slice" or if plural "slices"). As a result, not only is a first reference features set generated for the original reference image, at least one other reference features set(s) is generated for the partial image(s) of the original image. Note that although more reference features are being used for image processing, the additional reference features set(s) generated for a slice(s) is partitioned/separate from the first reference features set of the original reference image.

Even when only a part of the object is visible in the camera image frame, object recognition and/or tracking can still successfully occur because enough features in the extracted features set of the camera image frame can be found matching the features in the reference features set of a part of the reference image. The object, even though appearing "zoomed in" in the camera image frame, can still be recognized and tracked, e.g., using the reference features set generated from a slice of the original reference image (corresponding to the part of the object that is visible in the camera image frame). The advantageous effect of slicing is applicable for both scale-invariant or non-scale-invariant features.

By slicing the reference image into slice(s) and generating a reference features set for each of the slice(s), the additional reference features set generated for the particular reference image (i.e., the reference features set(s) generated for the slice(s)) is partitioned from the reference features set of the original reference image. The augmented reality client is given the opportunity to better distribute or allocate the computational cost in the image processing function over the various reference features sets when it is partitioned. For instance, the augmented reality client may decide at different times which of the various reference features sets to process, or how coarsely/finely should each of the reference features sets be processed in the image processing function. Partitioning of various reference features sets provides flexibility. Note that if one simply extracts a larger reference features set at a higher resolution to solve the problem, the image processing function has no choice but to also process those additional reference features each time the reference features set is used.

Furthermore, the system may decide or choose certain portions of a particular reference images to be made into a slice and generate additional reference features set(s) thereof, depending on the content placement. This allows more flexibility in determining where the system could expend more computational costs or resources in generating and using the additional reference features sets generated for the slices, when compared to the solution of generating more features from the original reference image at a higher resolution.

Furthermore, because the reference features sets of the original reference image and the slice(s) are partitioned, the chance of falsely detecting an object is not as high, when compared to the solution of generating more features from the original reference image at a higher resolution. The partitioning enables the possibility of false-positives to be contained within each reference features set.

Another way to improve object recognition and/or tracking on the augmented reality client, is to move the displayed content item (i.e., the augment) to maintain some overlap of the content with the object, preferably overlapping a part of the object where features are concentrated. For instance, if the user is looking at content item 704*b* closely (i.e., "zoomed-in") and while the area of the object outside of the area of slice 03 is not shown, the content item may be moved and/or slide downwards (e.g., update the position of the content item towards the center point of the object) to overlap with the text "LOREM IPSUM" more so that the features in that area may enable object recognition and/or tracking to occur. The extent of the sliding may be limited by whether the content item being moved would interfere with other content items displayed. The sliding effect ensures that the user does not drift the view of the camera too far away from the area where features are concentrated, to the point where not enough features are in the image frame for object recognition and/or tracking to occur. If the movement to move away from the content item is detected, then the content item may move and/or slide back to its original position.

To trigger the sliding effect, the augmented reality client may detect that the user is looking at the content item and/or interested in the content item. For instance, the focus point and/or the pointing direction of the camera can be determined from the pose information of the object. By calculating the movement in three-dimensional space from the pose information, the image processing function can determine and/or detect the movement of the device to zoom in and point the view towards the content item.

FIGS. 8*a-d* depict illustrative placements of content in relation to the object, according to one embodiment of the disclosure. Besides determining a two-dimensional region for (optimally) placing content in relation to the reference image, in some embodiments, the content may be placed in relation to the reference image with a tilt component.

In one embodiment, the tilt component is determined by the optimizer, dependent on the characteristics of the reference image (e.g., feature density, prior distributions, etc.).

In another embodiment, the tilt component may alternatively or additionally be determined based on other factors. For instance, the tilt component may vary depending on the angle at which the user is looking at the object. As the user is moving around, the tilt component may be configured to show the content item straight on to the user (e.g., perpendicular to the line of gaze). The tilt component may be configured to avoid interference with important part(s) of the object or other content item(s) associated with the object. The tilt component may be configured to always display the content item at a fixed angle from the reference object, such that the reference object can still be seen at a sufficient angle to enable object recognition and/or tracking even when the user is looking at and/or focusing on the content item (e.g., displaying the content item at 90 degree angle from the object may not be desirable because then the object is too skewed to be recognized/tracked if the user is looking at the content item "straight on").

Figure 9:
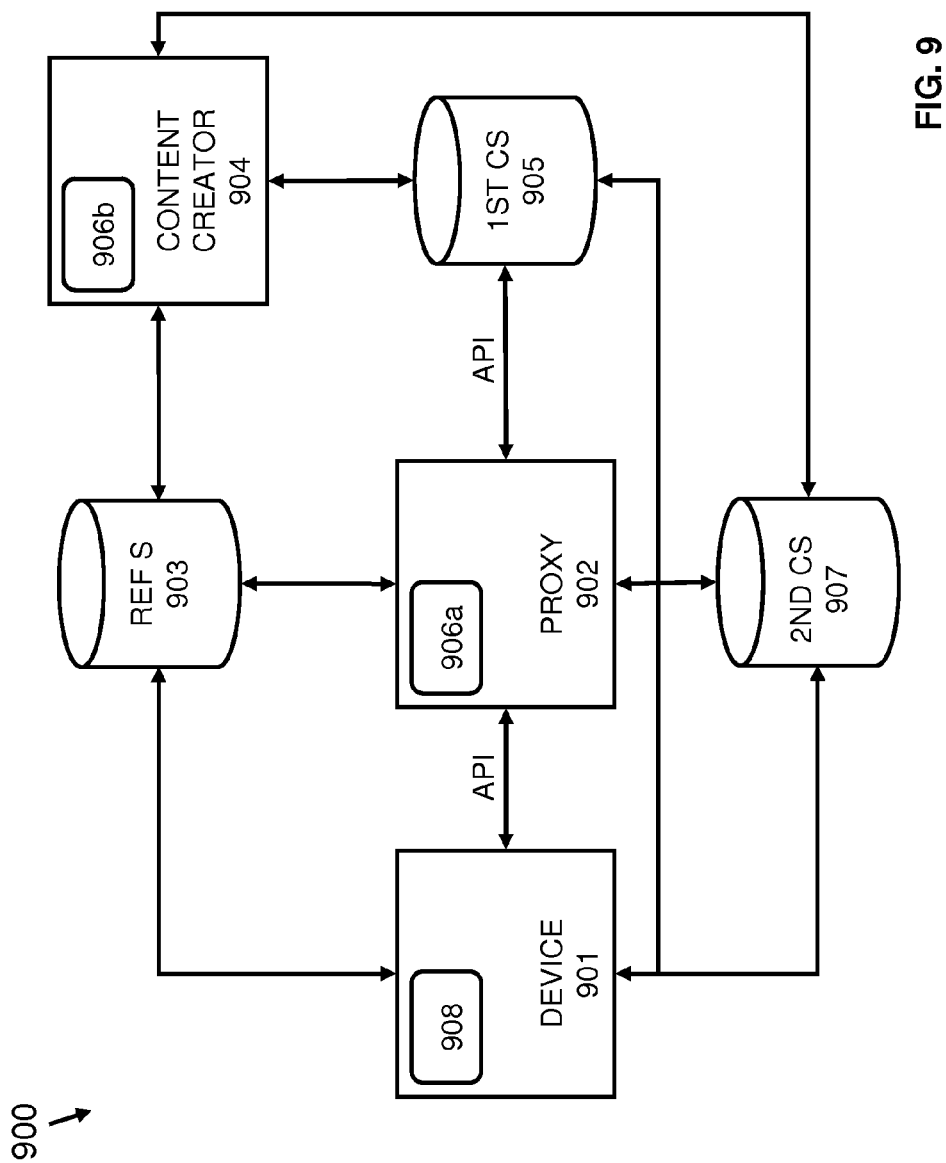
FIG. 9 depicts an illustrative augmented reality system, according to one embodiment of the disclosure.

FIG. 9 depicts an illustrative augmented reality system, according to one embodiment of the disclosure. In some embodiments, the augmented reality system is a distributed system wherein a plurality of entities are remote from each other. For instance, content items may be stored in a distributed manner such that the augmented reality system is more scalable. Depending on the infrastructure, the optimizer as discussed herein for automatically-placing content items may be implemented within the system differently, depending on whether content items are automatically-placed near content generation time, or near the time when the content is retrieved.

The augmented reality system 900 comprises at least one augmented reality device 901, which may be communicably connected to a proxy server 902 (or any suitable server). The proxy is configured to process requests from the augmented reality device(s) and provide responses to the augmented reality device(s). For instance, the proxy may retrieve and/or provide resources (e.g., reference features for object recognition and/or tracking, content item(s), etc.) for the augmented reality device such that an augmented reality experience is provided to the user of the augmented reality device. An augmented reality service client 908 (served by the proxy server) may be implemented in the augmented reality device to provide the augmented reality experience.

The augmented reality system may comprise at least one content source (e.g., implemented as a content server) for storing content items. In this embodiment, the augmented reality system comprises at least one of: a first content source 905 and a second content source 907. The content items stored on the content source(s) comprises content used to augment the real world scenery, and the content is used to generate computer generated graphics for display on the augmented user device. The distributed infrastructure advantageously enables content to be independently managed by a plurality of content providers.

Furthermore, the augmented reality system may comprise a reference features source 903 where reference features set(s) and/or reference image(s) are stored. In some embodiments, the reference features source is at least partly built-in the augmented reality device. Content providers may submit reference image(s) to a reference features generator (not shown) such that at least one reference feature set is generated from the image. In some embodiments, the reference image may be sliced or partitioned such that further reference features sets may be generated from the part of the reference image. Said further reference features sets may be stored in the reference features source.

There are more than one way in which content items can be generated and stored in a content source. In some embodiments, a content provider may define and store content item(s) and any associated metadata by using a defined application programming interface (API). Accordingly, the responses to requests for content item(s) is standardized in a known format that can be processed by the proxy and/or the augmented reality device. Using an API when creating content may require some technical computer programming expertise.

In some embodiments, the augmented reality system may include a content creator 904 that provides a service to users (i.e., content providers) to create content for use in augmented reality. For instance, the content creator may include a server for providing a client application in which users can create and edit content and submit content items to a content source. The application may be a What-You-See-Is-What-You-Get editor for adding content on a reference image, e.g., such as dragging and dropping a virtual video player object/placeholder onto the reference image to add a video to the object. The application may then process the user input received (e.g., the URL to the video, position information and/or size information of the video on the basis of where the user has dragged and dropped the video object) to generate any associated metadata, for example, in accordance with an application programming interface. The content item and the associated metadata may then be stored in a content source.

An optimizer 906a-b may be at least partly implemented at the proxy and/or the content creator for determining a suitable position to place content in relation to a reference image and/or an object. If content (auto)placement is to occur near content retrieval time, then the optimizer is preferably implemented in the proxy. In some embodiments, the placement of content in an optimizer at the proxy may further take into account (i.e., avoid interfering with) any other content items that has already been placed (having a pre-defined or pre-determined position) in relation to the reference image and/or object. For instance, the other content has already been specified with a previously determined position and/or size by a third-party that is not the augmented reality service provider providing the proxy. Accordingly, the proxy can determine in an online manner where to place further content in addition to the other content. If there is no other content pre-defined for the object, or the content placement of the pre-defined content is already known, then the content (auto) placement may occur near (or soon after) content creation time. In those embodiments, the optimizer may be implemented in e.g., the content creator. For instance, the optimizer may determine content placement soon after the identity of content to be displayed has been specified. In another example, the optimizer may determine content placement by taking into account the pre-defined placement of other content. As such, the content item is placed in an offline manner.

Figure 10:
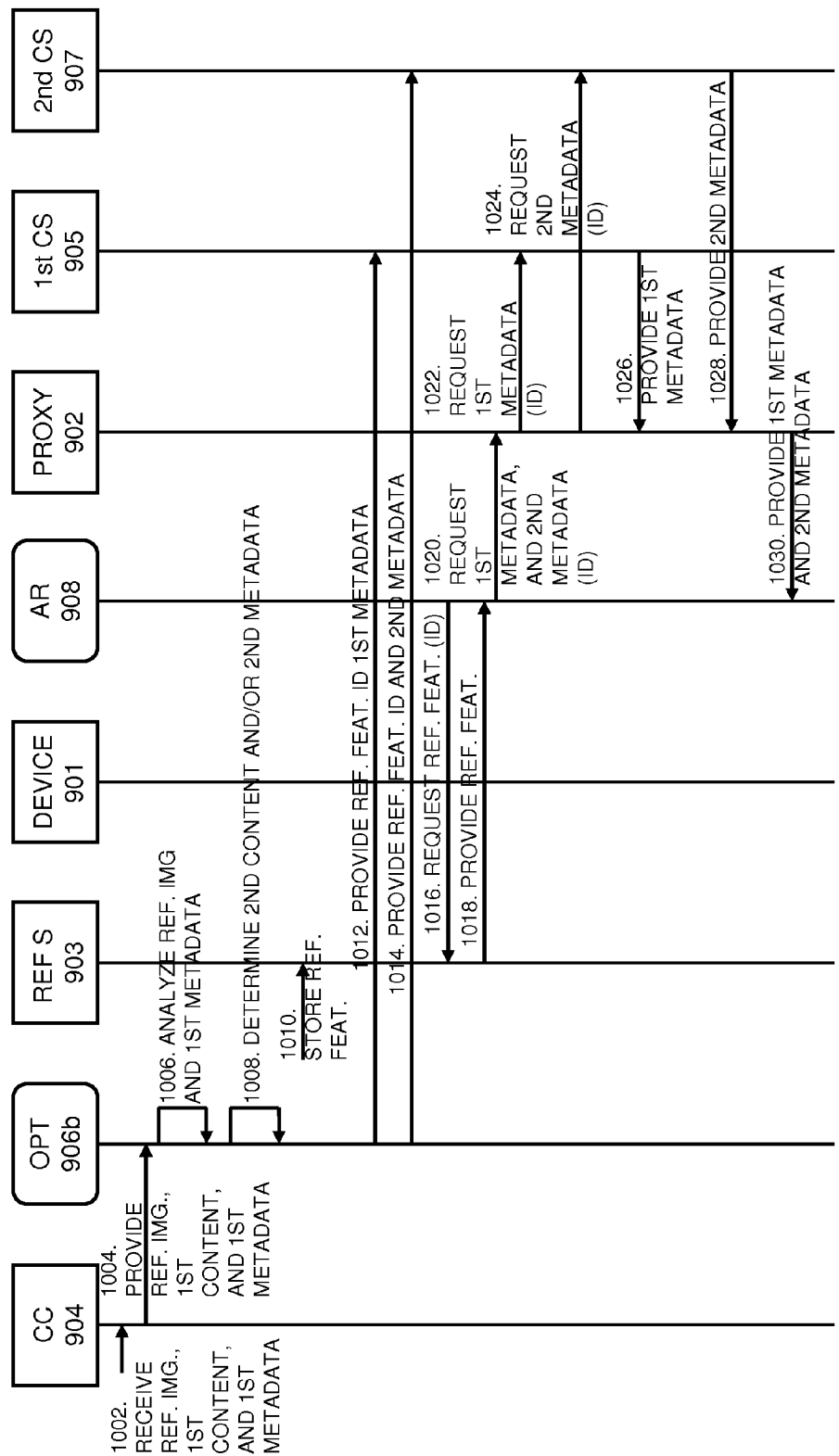
FIG. 10 depicts a messaging diagram for automatically placing content in an offline manner, according to one embodiment of the disclosure.

FIG. 10 depicts a messaging diagram for automatically placing content in an offline manner, according to one embodiment of the disclosure. The messaging diagram illustrates the process of automatically placing further (secondary) content, e.g., advertisements, while taking into account the (primary) content. Placing content in an offline manner is suitable where the metadata (i.e., position and/or sizing information) of the primary content is pre-determined.

In some embodiments, a content creator receives a reference image, a first content and a first metadata (step 1002). A reference image may include a digital image of the object to be augmented. For instance, a content provider may upload a reference image of the object (e.g., a digital image) to the content creator. A first content may be an image, video, text, graphic, a virtual object, and/or any suitable media item suitable for augmenting the object in augmented reality. In one embodiment, a Universal Resource Locator (URL) and/or a path to locate the content is provided rather than the content itself. For example, a World Wide Web (WWW) address to an image and/or a video is provided to the content creator. The content creator may receive the first metadata that comprises position information for the first content, which specifies the position of the content in relation to the reference image and/or object. The first metadata may further include sizing information for the first content, which may specify the height and width of the image. In some embodiments, the sizing information is specified by an aspect ratio. In this disclosure, the content (or a reference thereto) and the metadata together is referred to as a content item.

A reference features generator (not shown) may generate at least one reference features set from the reference image. The at least one reference features set (and if applicable, the reference image as well) may be stored in the reference features source (step 1010), and in some embodiments, a reference features set is associated with a substantially unique identifier that enables a particular and/or a plurality of reference features set(s) associated with a particular object to be retrieved.

Near content creation time, the reference image is provided to an optimizer (step 1004) such that the placement for a second content item can be determined and/or optimized. In some embodiments, the first content and/or the first metadata is also provided to the optimizer if the placement of the first content item is to be taken into account when automatically placing the second content item. According to the methods and systems described therein, the optimizer automatically places the second content item by analysing the reference image, and if applicable, the first metadata as well. For instance, the optimizer determines a feature density map of the reference image. In some embodiments, the first metadata may affect the possible positions in which the second content item can be placed. The second metadata, and if applicable, the second content is determined (step 1008). For instance, if the second content is known (the second content to be placed is pre-determined, including its size and/or aspect ratio), then the second metadata is determined. In some embodiments, more than one possible content may be placed, and the second content is determined on the basis of the result(s) from step 1006.

The first metadata, and if applicable, the first content as well, may be stored in the first content source (step 1012). The second metadata, and if applicable, the second content as well, may be stored in the second content source (step 1014). In some embodiments, the metadata and the content itself may be stored in the same source, where as in some other embodiments, the metadata and the content are stored in separate sources. The location information specifying at which metadata associated with augmented reality content for a particular object is stored (i.e., path(s) to various content sources) may be provided to the proxy.

During operation, an augmented reality client may request at least one reference features set(s) associated with a particular object from the reference features source (step 1016) using an identifier associated with. In response, the reference features may then be provided to the augmented reality client (step 1018).

In some embodiments, when an object is recognized and/or expected to be recognized, the augmented reality client may retrieve the associated metadata for content to be displayed. The metadata may include a path to locate the content, position information of the content in relation to the reference image and/or the object, and sizing information of the content. For instance, the augmented reality client may request through a proxy for the first metadata and/or the second metadata using an identifier that is associated with an object to be augmented and/or a reference features set associated with that object (step 1020). The proxy may then retrieve the first metadata using the identifier from the first content source (step 1022). The proxy may also retrieve the second metadata using the identifier from the second content source (step 1024). The first content source, in response to the request, may provide the first metadata to the proxy (step 1026), and the second content source, in response to the request, may provide the second metadata to the proxy (step 1028). The proxy may then provide the first metadata and the second metadata (e.g., described in a particular Application Programming Interface) to the augmented reality client (step 1013). In some embodiments, the metadata of a content item includes at least one of: a path for the augmented reality client to retrieve the content of the content item, position information of the content in relation to the reference image or the object to be augmented, and sizing information of the content.

Figure 11:
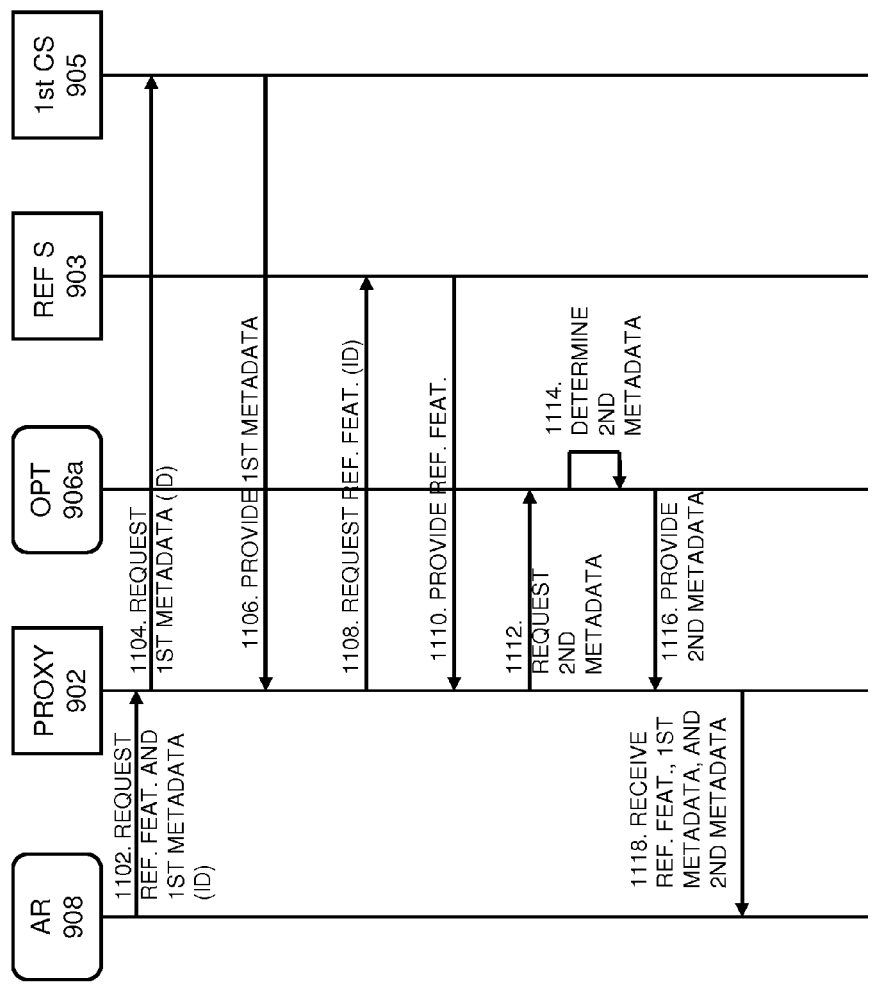
FIG. 11 depicts a messaging diagram for automatically placing content in an online manner, according to one embodiment of the disclosure.

FIG. 11 depicts a messaging diagram for automatically placing content in an online manner, according to one embodiment of the disclosure. Content may be advantageously automatically placed near content retrieval time when the metadata for the first content is not known by or not stored in the proxy. In another situation, the first content does not have any associated position and/or sizing information, and that information has to be determined by the optimizer. In the latter, the content to be used for augmenting an object does not have any pre-determined position information and/or sizing information. As a result, the optimizer may determine near content retrieval time the position information and/or sizing information for that content. In the former, a first content item to be used for augmenting an object has been specified by a third-party content provider, and the position information and/or the sizing information associated with the first content item is not known until (near) content retrieval time. Accordingly, the position and/or sizing information associated second content item is determined by the optimizer near content retrieval time, if the placement of the first content item is to be taken into account (i.e., to avoid interfering with the first content item). This figure illustrates the latter situation.

The augmented reality client may request at least one reference features set and a first metadata associated with a first content item through a proxy (step 1102), using an identifier. The identifier may substantially uniquely identifies an object to be augmented and/or at least one reference features set generated from a reference image and/or a part of the reference image of that object. The proxy may then retrieve the first metadata of the first content item from the first content source (step 1004 and step 1006). The first metadata may include position information and/or sizing information associated with the first content item. Furthermore, the metadata may include a path that enables the augmented reality content to retrieve the content of the first content item. The proxy may retrieve the at least one reference features set from a reference features source (step 1008 and step 1110).

Upon determining that a second content item is to be displayed on the augmented reality client (in addition to the first content item), the proxy may then request the optimizer to provide a second metadata for a second content item (step 1112). For instance, the proxy may determine that an advertisement (i.e., the second content item) should be displayed. In another instance, the proxy may determine that interesting/additional/supplementary/secondary information is to be displayed in addition to displaying the first content item. According to methods and systems described therein, the optimizer determines the second metadata for the second content item (step 1114). The second metadata may include at least one of: a path for the augmented reality client to retrieve the content of the content item, position information of the content in relation to the reference image or the object to be augmented, and sizing information of the content. The optimizer then provides the determined second metadata to the proxy (step 1116). The reference features set, the first metadata and the second metadata may be provided to the augmented reality client (step 1118) to enable the augmented reality experience.

Figure 12:
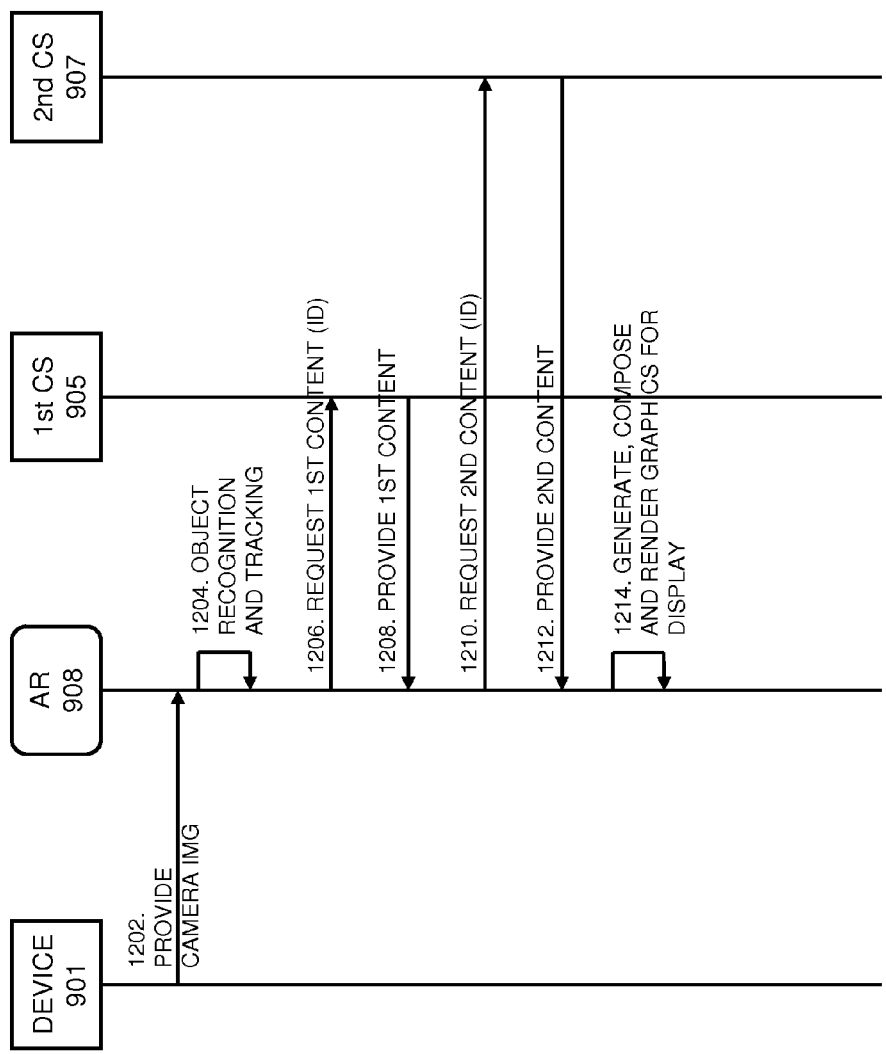
FIG. 12 depicts a messaging diagram for generating an augmented reality view, according to one embodiment of the disclosure.

FIG. 12 depicts a messaging diagram for generating an augmented reality view, according to one embodiment of the disclosure. To provide the augmented reality experience, the augmented reality client uses the retrieved reference features set(s) and metadata to generate the computer generated graphics for augmenting the real world scenery.

A digital imaging device (e.g., a camera of a mobile user device) may provide at least one camera image of the real world scenery to the augmented reality client (step 1202). On the basis of at least one camera image of the real world scenery and any reference features sets already retrieved by and/or stored in the augmented reality client, the augmented reality client performs object recognition and tracking such that pose information associated with the object to be augmented may be determined. Furthermore, if the metadata specifies a path to retrieve the content of a content item, then the augmented reality content can request the content from the content sources using, e.g., an identifier associated with the reference features set that produced the detection of the object and/or an identifier associated with the object. Accordingly, the augmented reality client may retrieve the first content and the second content using the identifier from the first content source and the second content source, respectively (steps 1206, 1208, 1201, 1212). Using the pose information, the first content and the second content are then provided to a graphics generator such that computer generated graphics can be generated, and the generated graphics are then rendered for display (step 1214). The content is preferably scaled, transformed, and/or rotated in such a way that the content appears stuck to the object being augmented. The computer generated graphics may be composed with the camera image of the real world scenery and the composed image is displayed to provide the augmented reality experience. In some embodiments, the computer generated graphics may be projected onto glasses or onto the real world scenery to provide the augmented reality experience.

Although FIGS. 10-12 recites the term "step", it is not to be construed that each of these steps must be performed one after another, but in some cases, the order in which the steps are performed may vary, and/or the steps may be performed in parallel.

In the context of this disclosure, the AR device may comprise an Operating System (OS) or other suitable system for managing the resources of the device as well as the data and information transmission between the various components of the device. Application Programming Interfaces (APIs) associated with the OS may allow application programs to access services offered by the OS. For example, one API may be configured for setting up wired or wireless connections to data transport network. Mobile service applications in communication module may be executed enabling the AR application to access servers and/or databases in connected to the data transport network. In another example, the OS may enable the AR application to access the image frames stored in the memory of the AR device.

In some embodiments, an AR device may comprise a processor (e.g., a processor 202 as shown in FIG. 2) for performing computations for carrying the functions of device, for instance the image processing function for performing object recognition and/or tracking. In some embodiments, the processor includes a graphics processing unit specialized for rendering and generating computer-generated graphics, e.g., to generate augmentations based on the pose information and/or metadata associated with the reference features set from which the pose information is determined. Preferably, processor is configured to communicate, via a communication bus with other components of device.

In some embodiments, an AR device may include a user interface (UI), comprising an input part and/or an output part for allowing a user to interact with the device. The user interface may be configured as a graphical user interface (GUI) on the basis of e.g. a touch-sensitive display. In that case, the UI may be part of the display. Other user interfaces may include a keypad, touch screen, microphone, mouse, keyboard, tactile glove, motion sensor or motion sensitive camera, light-sensitive device, camera, depth or range cameras, or any suitable user input devices. User interface may include visual output, as well as provide other output such as audio output, haptic output (e.g., vibration, heat), or any other suitable sensory output.

The AR application and/or the AR client, configured to provide an augmented reality experience and/or view to the user, may be at least partially implemented as a software program. Alternatively and/or additionally the AR application may be at least partially implemented in dedicated and specialized hardware processor. The implementation of the AR application may be a computer program product, stored in non-transitory storage medium, when executed on the processor, is configured to provide an augmented reality experience to the user. If an AR client is used, the client is configured to communicate with a server for accessing information needed to provide the augmented reality experience/view.

Although the present disclosure discusses primarily having a flat object such as a page in a magazine, a poster, a billboard, etc. as a target object (i.e., the object to be augmented), it is appreciated by one skilled in the art that the target object may be a three-dimensional object. In which case, the two-dimensional image of the three-dimensional object may present one side of the three-dimensional object, e.g., a side wall of a building.

Reference features or extracted features are used in this disclosure to describe broadly a plurality of features that may be extracted from a reference image and a camera image frame, respectively. These features enable object recognition and/or tracking to occur. Features in a reference features set or an extracted features set may be stored in the form of a specific data structure usually referred to as a feature descriptor.

Various known feature descriptor formats, including SIFT (Scale-invariant feature transform), SURF (Speeded Up Robust Features), HIP (Histogrammed Intensity Patches), BRIEF (Binary Robust Independent Elementary Features), ORB (Oriented-BRIEF), Shape Context, etc., may be used.

A feature descriptor may include at least a location in the image from which the feature is extracted, descriptor data, and optionally, a quality score. On the basis of the quality score, features may be stored in an ordered list. For example, if extraction is performed on the basis of corner information ("cornerness") of structure in an image frame, the list may be sorted in accordance to a measure based on this corner information.

With some modifications, one skilled in the art may extend the embodiments described herein to other architectures, networks, or technologies.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the disclosure is not limited to the embodiments described above, which may be varied within the scope of the accompanying claims.

The invention claimed is:

1. A method for determining placement of a first virtual content item in relation to a real world object in augmented reality, comprising:
   determining locations of object recognition and/or tracking features in an image of the object;
   providing a plurality of candidate regions, each candidate region defined by a candidate position (X) in relation to the image and a candidate size (S);
   for each of the candidate regions for placing the first virtual content item:
      determining a first measure ($D_i$) representative of a feature density within the candidate region based on the locations of the object recognition and/or tracking features in the image;
      determining a second measure ($D_a$) representative of feature density within an area adjacent to the candidate region; and
      determining a third measure ($p_o(f)$), wherein the third measure is negatively correlated with the first measure and the third measure is positively correlated with the second measure, or vice versa, such that the third measure has small values for a case of low feature densities inside and high feature densities adjacent to the candidate region, and such that the third measure has large values for the case of high feature densities inside and low feature densities adjacent to the candidate region;
   selecting at least one region from the plurality of candidate regions for placement of the first virtual content item based on the third measure; and
   providing the position and the size of the at least one selected region to an augmented reality application, wherein the augmented reality application is configured to generate computer graphics on the basis of the position, the size, and a pose of the real world object estimated from an image frame, said computer graphics being for display to a user on a display device of an augmented reality system.

2. The method of claim 1, further comprising:
   for the at least one candidate region:
      further determine a fourth measure (p(X,S)) of whether the candidate region overlaps with a second virtual content item placed in relation to the real world object;
   selecting the at least one region based further on the fourth measure.

3. The method of claim 2, wherein selection of the at least one region is based on a product of (1) a likelihood term based on the third measure, and (2) a prior probability term based on the fourth measure.

4. The method of claim 2, wherein the fourth measure has a non zero value when the candidate region does not overlap with the second virtual content item placed in relation to the real world object and/or does overlap with a predefined area of allowed placement in relation to the real world object.

5. The method of claim 1, further comprising:
   for the at least one candidate region for placing the first virtual content item:
      further determine a fourth measure (p(X,S)) of a prior probability of placing the first virtual content item at the respective location;
   selecting the at least one region based further on the fourth measure.

6. The method of claim 1, wherein the third measure is a probabilistic measure of the candidate region being a suitable placement for the first virtual content item given the location of the object recognition and/or tracking features in the image of the object.

7. The method of claim 1, wherein the third measure is determined based on a function of a ratio between the first measure and a second measure, preferably defined by, $$f(X,S) = \begin{cases} \frac{D_i}{D_a}, & \frac{D_i}{D_a} < m \\ m, & \text{otherwise} \end{cases}$$

where m is a maximum value for the ratio to prevent numerical issues for the when $D_a$ becomes close to zero.

8. The method of claim 7, wherein the third measure is defined as $$p_o(f) = \lambda_f \exp^{-\lambda_f f(X,S)}$$

wherein the rate parameter $\lambda_f$ determining the steepness of the probability density function, and $f(x,y)$ is the function comprising the ratio between the first measure and a second measure.

9. The method of claim 1, wherein the third measure is negatively correlated with the first measure and positively correlated with the second measure.

10. The optimizer of claim 1 wherein the plurality of candidate regions include first and second candidate regions of different sizes.

11. The optimizer of claim 1 wherein the plurality of candidate regions include first and second candidate regions of different shapes.

12. An optimizer for use in an augmented reality system having a processor, the optimizer comprising:
   a feature analyzer algorithm implemented by the processor and configured to determine locations of features in an image of the object, wherein the features are object recognition and/or tracking features;
   a processor algorithm, for at least one candidate region for placing the first virtual content item, said candidate region defined by a candidate position (X) in relation to the image and a candidate size (S), further implemented by the processor and configured to:
  determine a first measure ($D_i$) representative of a feature density within the candidate region based on the locations of features in the image;
  determine a second measure ($D_a$) representative of feature density within an area adjacent to the candidate region; and
  determine a third measure ($p_o(f)$), wherein the third measure is:
    correlated with the first measure in a first direction;
    correlated with the second measure in a second direction opposite from the first direction, wherein the third measure has small values for a case of low feature densities inside and high feature densities adjacent to the candidate region, and wherein the third measure has large values for the case of high feature densities inside and low feature densities adjacent to the candidate region; and
  a selector algorithm implemented by the processor and configured to select at least one region from the at least one candidate region for placing the first virtual content item based on the third measure; and wherein the processor provides the position and the size of the at least one selected region to an augmented reality application, wherein the augmented reality application is configured to generate computer graphics on the basis of the position, the size and a pose of the real world object estimated from an image frame, said computer graphics being for display to a user on a display device of an augmented reality system.

13. The augmented reality client of an augmented reality system comprising the optimizer of claim 12 and/or communicably connected to the optimizer of claim 12, further comprising:
  an image processing function configured to determine a pose of the real world object on the basis of an image frame captured by a digital imaging device of the augmented reality system; and
  a graphics generator configured to generate computer graphics on the basis of the determined pose, the position and the size of the selected region, said computer graphics for display to a user on a display device of the augmented reality system.

14. The augmented reality system comprising an augmented reality client according to claim 13, further comprising:
  a reference features generator algorithm implemented on the processor and configured to extract a first reference features set on the basis of the image of the real world object; and
  wherein the image processing function is configured to determine the pose of the real world object further on the basis of the first reference features set.

15. The augmented reality system of claim 14, wherein:
  the reference features generator is configured to extract a second reference features set on the basis of a portion of the image of the real world object, and the image processing function is configured to determine the pose of the real world object further on the basis of the second reference features set.

16. The optimizer of claim 12 wherein the processor is further configured
  for the at least one candidate region:
    determine a fourth measure ($p(X,S)$) of whether the candidate region overlaps with a second virtual content item placed in relation to the real world object;
    wherein the selector is configured to select the at least one region based further on the fourth measure.

17. A computer program product, implemented on computer-readable non-transitory storage medium, the computer program product configured for, when run on a computer, executing a method comprising:
  determining locations of features in an image of the object, wherein the features are each object recognition and/or tracking features;
  providing a plurality of candidate regions, each candidate region defined by a candidate position (X) in relation to the image and a candidate size (S);
  for each of the candidate regions for placing the first virtual content item:
    determining a first measure ($D_i$) representative of a feature density within the candidate region based on the locations of features in the image;
    determining a second measure ($D_a$) representative of feature density within an area adjacent to the candidate region; and
    determining a third measure ($p_o(f)$), wherein the third measure is negatively correlated with the first measure and the third measure is positively correlated with the second measure, or vice versa, wherein the third measure has small values for a case of low feature densities inside and high feature densities adjacent to the candidate region, and wherein the third measure has large values for the case of high feature densities inside and low feature densities adjacent to the candidate region;
  selecting at least one region from the plurality of candidate regions for placement of the first virtual content item based on the third measure; and
  providing the position and the size of the at least one selected region to an augmented reality application, wherein the augmented reality application is configured to generate computer graphics on the basis of the position, the size, and a pose of the real world object estimated from an image frame, said computer graphics being for display to a user on a display device of an augmented reality system.

18. The computer program product of claim 17, wherein the ratio between the first measure and a second measure is defined by, $$f(X, S) = \begin{cases} \frac{D_i}{D_a}, & \frac{D_i}{D_a} < m \\ m, & \text{otherwise} \end{cases}$$

where m is a maximum value for the ratio to prevent numerical issues for the when $D_a$ becomes close to zero.